US010891167B2

(12) United States Patent
Sharkey

(10) Patent No.: US 10,891,167 B2
(45) Date of Patent: Jan. 12, 2021

(54) MEMORY FRACTIONATION SOFTWARE PROTECTION

(71) Applicant: Siege Technologies LLC, Manchester, NH (US)

(72) Inventor: Joseph James Sharkey, Deerfield, NY (US)

(73) Assignee: Siege Technologies, LLC, Manchester, NH (US)

( * ) Notice: Subject to any disclaimer, the term of this patent is extended or adjusted under 35 U.S.C. 154(b) by 182 days.

(21) Appl. No.: 15/328,605

(22) PCT Filed: Dec. 20, 2016

(86) PCT No.: PCT/US2016/067679
§ 371 (c)(1),
(2) Date: Jan. 24, 2017

(87) PCT Pub. No.: WO2017/116827
PCT Pub. Date: Jul. 6, 2017

(65) Prior Publication Data
US 2018/0046516 A1 Feb. 15, 2018

Related U.S. Application Data

(60) Provisional application No. 62/272,909, filed on Dec. 30, 2015.

(51) Int. Cl.
G06F 9/50 (2006.01)
G06F 9/28 (2006.01)
(Continued)

(52) U.S. Cl.
CPC ............ G06F 9/5066 (2013.01); G06F 9/28 (2013.01); G06F 9/46 (2013.01); G06F 9/50 (2013.01);
(Continued)

(58) Field of Classification Search
CPC ........... G06F 3/06; G06F 11/10; G06F 12/08; G06F 12/1408; G06F 12/1433; G06F 12/1458; G06F 17/30; G06F 21/14
(Continued)

(56) References Cited

U.S. PATENT DOCUMENTS 8,464,349 B2 * 6/2013 Yee .................... G06F 21/53
711/136
10,468,077 B2 * 11/2019 Chagam Reddy ...... G06F 12/08
(Continued)

FOREIGN PATENT DOCUMENTS

WO    2000045257 A2    8/2000

OTHER PUBLICATIONS

International Search Report and Written Opinion Issued in PCT Application No. PCT/US2016/67679, dated Mar. 10, 2017, 3 Pages.
(Continued)

Primary Examiner — Jahangir Kabir
(74) Attorney, Agent, or Firm — Morgan, Lewis & Bockius LLP

(57) ABSTRACT

A method of protecting software in a computer system includes defining a memory fractionation configuration for an application software program in the computer system, fractionating at least one page of the application software program into fractions according to the memory fractionation configuration, and running the application in such a manner that, at any particular point in time when the application is running, at least a first one of the fractions is stored in a manner that is not accessible from a user space or a kernel space of the computer system.

26 Claims, 18 Drawing Sheets

(51) Int. Cl.
- *G06F 12/14* (2006.01)
- *G06F 12/08* (2016.01)
- *G06F 9/46* (2006.01)
- *G06F 21/14* (2013.01)
- *G06F 16/00* (2019.01)

(52) U.S. Cl.
CPC .......... *G06F 12/08* (2013.01); *G06F 12/1408* (2013.01); *G06F 12/1433* (2013.01); *G06F 12/1458* (2013.01); *G06F 16/00* (2019.01); *G06F 21/14* (2013.01); *G06F 2212/1052* (2013.01); *G06F 2212/152* (2013.01); *G06F 2221/2125* (2013.01)

(58) Field of Classification Search
USPC ......................................................... 713/193
See application file for complete search history.

(56) References Cited

U.S. PATENT DOCUMENTS

| | | | |
|---|---|---|---|
| 2007/0028244 A1 | 2/2007 | Landis et al. | |
| 2008/0244135 A1 | 10/2008 | Akesson et al. | |
| 2009/0132059 A1* | 5/2009 | Schultz | G05B 19/05 700/7 |
| 2013/0086299 A1* | 4/2013 | Epstein | G06F 12/1475 711/6 |
| 2013/0097354 A1* | 4/2013 | Arges | G06F 12/1458 711/6 |
| 2013/0262739 A1* | 10/2013 | Bennett | G06F 3/0689 711/102 |
| 2014/0020112 A1* | 1/2014 | Goodes | G06F 9/5016 726/26 |
| 2014/0358972 A1* | 12/2014 | Guarrieri | G06F 17/30289 707/781 |
| 2015/0130825 A1* | 5/2015 | Liao | G06T 1/60 345/543 |
| 2016/0119137 A1* | 4/2016 | Sethumadhavan | G06F 12/0897 713/190 |
| 2017/0039085 A1* | 2/2017 | Meriac | G06F 21/74 |

OTHER PUBLICATIONS

Weng, Chenxi, et al: Protection of Software-based Survivability Mechanisms; International Conference on Dependable Systems and Networks, Jul. 1-4, 2001.

* cited by examiner

FRAGMENT 1 MEMORY

| OFFSET (h) | 00 | 01 | 02 | 03 | 04 | 05 | 06 | 07 | 08 | 09 | 0A | 0B | 0C | 0D | 0E | 0F | |
|---|---|---|---|---|---|---|---|---|---|---|---|---|---|---|---|---|---|
| 000008E0 | 00 | 01 | 02 | 03 | CC | CC | CC | CC | CC | CC | CC | CC | CC | CC | CC | CC | ÌÌÌÌÌÌÌÌÌÌÌÌÌÌÌÌ |
| 000008F0 | CC | CC | CC | CC | CC | CC | CC | CC | CC | CC | CC | CC | CC | CC | CC | CC | ÌÌÌÌÌÌÌÌÌÌÌÌÌÌÌÌ |
| 00000900 | CC | CC | CC | CC | CC | CC | CC | CC | CC | CC | CC | CC | CC | CC | CC | CC | ÌÌÌÌÌÌÌÌÌÌÌÌÌÌÌÌ |
| 00000910 | 55 | 8B | EC | 81 | EC | E8 | 00 | 00 | 00 | 53 | 56 | 57 | 8D | BD | 18 | FF | U‹ì.ìè...SVW.½.ÿ |
| 00000920 | FF | FF | B9 | 3A | 00 | 00 | 00 | CC | CC | CC | F3 | AB | C7 | 45 | E0 | 00 | ÿÿ¹:...ÌÌÌó«ÇEà. |
| 00000930 | F8 | 12 | 00 | 00 | 00 | C7 | 45 | DC | 01 | 00 | 00 | FF | 15 | DC | 82 | 41 | ø....ÇEÜ...ÿ.Ü‚A |
| 00000940 | 00 | 00 | 00 | 8B | F4 | 68 | F4 | E8 | 2C | 59 | 41 | FF | FF | 8B | BB | 18 | ...‹ôhôè,YAÿÿ‹».YA |
| 00000950 | 83 | C4 | 04 | 3B | F4 | FA | F7 | 00 | 83 | C4 | 04 | 3B | F4 | E8 | E3 | FF | ƒÄ.;ôúê÷.ƒÄ.;ôè+ÿ |
| 00000960 | 00 | FF | 15 | DC | 82 | 41 | 00 | EC | 50 | 8B | 4D | DC | 51 | E8 | CF | FF | .ÿ.Ü‚A.ìP‹MÜQèÏÿ |
| 00000970 | FF | 8B | 45 | F8 | 89 | 45 | E0 | 8B | 45 | E0 | 83 | E8 | 01 | 89 | 45 | EC | ÿ‹Eø‰Eà‹Eàƒè.‰Eì |
| 00000980 | 99 | 52 | 50 | 8B | 45 | E0 | 8B | 50 | 50 | 8B | 45 | EC | 51 | 8B | F8 | 52 | ™RP‹EàèP‹Eì<UeRh |
| 00000990 | 89 | 45 | DC | 89 | 55 | E0 | CC | CC | CC | CC | 8B | 45 | EC | 83 | E8 | 01 | ‰EÜ‰Uà<Eìƒè.‰Eì |
| 000009A0 | D6 | CC | CC | CC | CC | CC | CC | CC | CC | 8B | 4D | DC | 51 | E8 | 52 | 68 | ÖÌÌÌÌÌÌÌÌ‹MÜQèRh |
| 000009B0 | EC | 58 | 41 | 00 | FF | 15 | DC | 82 | 41 | 00 | 83 | C4 | 10 | 3B | F4 | E6 | ìXA.ÿ.Ü‚A.ƒÄ.;ôæ |
| 000009C0 | 90 | F7 | FF | 8B | F4 | 68 | F4 | E8 | 79 | F7 | FF | FF | 8B | F4 | 68 | 2C | .÷ÿ‹ôhôèy÷ÿÿ‹ôh, |
| 000009D0 | 00 | 83 | C4 | 04 | 3B | F4 | 15 | DC | 82 | 41 | 00 | 83 | C4 | 04 | 3B | F4 | .ƒÄ.;ô.Ü‚A.ƒÄ.;ô |
| 000009E0 | 41 | 00 | FF | 15 | DC | 82 | 41 | C4 | E8 | 00 | 00 | 3B | EC | E8 | 52 | F7 | A.ÿ.Ü‚AÄè..;ìèR÷ |
| 000009F0 | FF | FF | 5F | 8B | 5E | 5B | 81 | C4 | 04 | 00 | 00 | 3B | EC | E8 | 62 | F7 | ÿÿ_‹^[.Ä...;ìèb÷ |
| 00000A00 | FF | FF | 8B | E5 | 5D | C3 | CC | CC | CC | CC | CC | CC | CC | CC | CC | CC | ÿÿ‹å]ÃÌÌÌÌÌÌÌÌÌÌ |
| 00000A10 | CC | CC | CC | CC | CC | CC | CC | CC | CC | CC | CC | CC | CC | CC | CC | CC | ÌÌÌÌÌÌÌÌÌÌÌÌÌÌÌÌ |
| 00000A20 | CC | CC | CC | CC | CC | CC | CC | CC | CC | CC | CC | CC | CC | CC | CC | CC | ÌÌÌÌÌÌÌÌÌÌÌÌÌÌÌÌ |
| 00000A30 | CC | CC | CC | CC | CC | CC | CC | CC | CC | CC | CC | CC | CC | CC | CC | CC | ÌÌÌÌÌÌÌÌÌÌÌÌÌÌÌÌ |
| 00000A40 | CC | CC | CC | CC | CC | CC | CC | CC | CC | CC | CC | CC | CC | CC | CC | CC | ÌÌÌÌÌÌÌÌÌÌÌÌÌÌÌÌ |

FIG.11A

| FIG.11A |
|---|
| FIG.11B |
| FIG.11C |

FIG.11

ORIGINAL APPLICATION MEMORY

| OFFSET (h) | 00 | 01 | 02 | 03 | 04 | 05 | 06 | 07 | 08 | 09 | 0A | 0B | 0C | 0D | 0E | 0F | |
|---|---|---|---|---|---|---|---|---|---|---|---|---|---|---|---|---|---|
| 000008E0 | CC | CC | CC | CC | CC | CC | CC | CC | CC | CC | CC | CC | CC | CC | CC | CC | îîîîîîîîîîîîîîîî |
| 000008F0 | CC | CC | CC | CC | CC | CC | CC | CC | CC | CC | CC | CC | CC | CC | CC | CC | îîîîîîîîîîîîîîîî |
| 00000900 | CC | CC | CC | CC | CC | CC | CC | CC | CC | CC | CC | CC | CC | CC | CC | CC | îîîîîîîîîîîîîîîî |
| 00000910 | 55 | 8B | EC | 81 | EC | E8 | 00 | 00 | 00 | 53 | 56 | 57 | 8D | BD | 18 | FF | U‹ìıìè...SVW.½.ÿ |
| 00000920 | FF | FF | B9 | 3A | 00 | 00 | 00 | B8 | CC | CC | CC | F3 | AB | C7 | 45 | E0 | ÿÿ¹:...¸ÌÌÌó«ÇEà |
| 00000930 | F8 | 12 | 00 | 00 | 90 | C7 | 45 | DC | 01 | 00 | 00 | 00 | FF | 15 | E0 | 41 | ø....ÇEÜ....ÿ.àA |
| 00000940 | 00 | 00 | 00 | 8B | F4 | 68 | 2C | 39 | 41 | 00 | FF | 15 | DC | 82 | 41 | 00 | ...‹ôh,9A.ÿ.Ü‚A. |
| 00000950 | 83 | C4 | 04 | 3B | F4 | E8 | FA | F7 | FF | FF | 88 | F4 | 88 | 8C | 59 | 41 | ƒÄ.;ôèú÷ÿÿ^ô^ŒYA |
| 00000960 | 00 | FF | 15 | DC | 82 | 41 | 00 | 83 | C4 | 04 | 3B | F4 | E8 | E3 | F7 | FF | .ÿ.Ü‚A.ƒÄ.;ôèã÷ÿ |
| 00000970 | FF | 8B | 45 | F8 | 88 | 45 | EC | 83 | 7D | EC | 01 | 7E | 24 | 8B | 45 | EC | ÿ‹Eø^Eì{}ì.~$‹Eì |
| 00000980 | 99 | 57 | 30 | 8B | 45 | E0 | 50 | 8B | 40 | DC | 31 | E8 | CF | F6 | FF | FF | ™WRP‹EàP‹@Ü1èÏöÿÿ |
| 00000990 | 89 | 45 | DC | 89 | 55 | E0 | 8B | 46 | EC | 83 | E8 | 01 | 89 | 45 | EC | EB | ‰EÜ‰Uà‹Fì.è.‰EìË |
| 000009A0 | D6 | 8B | F4 | 8B | 45 | E0 | 50 | 8B | 4D | DC | 51 | 8B | 55 | F8 | 52 | 68 | Ö‹ô‹EàP‹MÜQ‹UøRh |
| 000009B0 | EC | 58 | 41 | 00 | FF | 15 | DC | 82 | 41 | 00 | 83 | C4 | 10 | 3B | F4 | E8 | ìXA.ÿ.Ü‚A.ƒÄ.;ôè |
| 000009C0 | 90 | F7 | FF | FF | 8B | F4 | 68 | C8 | 58 | 41 | 00 | FF | 15 | DC | 82 | 41 | .÷ÿÿ‹ôhÈXA.ÿ.Ü‚A |
| 000009D0 | 00 | 83 | C4 | 04 | 3B | F4 | E8 | 79 | F7 | FF | FF | 8B | F4 | 68 | 2C | 59 | .ƒÄ.;ôèy÷ÿÿ‹ôh,Y |
| 000009E0 | 41 | 00 | FF | 15 | DC | 82 | 41 | 00 | 83 | C4 | 04 | 3B | F4 | E8 | 62 | F7 | A.ÿ.Ü‚A.ƒÄ.;ôèb÷ |
| 000009F0 | FF | FF | 5F | 5E | 5B | 81 | C4 | E8 | 00 | 00 | 00 | 3B | EC | E8 | 52 | F7 | ÿÿ_^[.Äè...;ìèR÷ |
| 00000A00 | FF | FF | 8B | E5 | 5D | C3 | CC | CC | CC | CC | CC | CC | CC | CC | CC | CC | ÿÿ‹å]ÃÌÌÌÌÌÌÌÌÌÌ |
| 00000A10 | CC | CC | CC | CC | CC | CC | CC | CC | CC | CC | CC | CC | CC | CC | CC | CC | îîîîîîîîîîîîîîîî |
| 00000A20 | CC | CC | CC | CC | CC | CC | CC | CC | CC | CC | CC | CC | CC | CC | CC | CC | îîîîîîîîîîîîîîîî |
| 00000A30 | CC | CC | CC | CC | CC | CC | CC | CC | CC | CC | CC | CC | CC | CC | CC | CC | îîîîîîîîîîîîîîîî |
| 00000A40 | CC | CC | CC | CC | CC | CC | CC | CC | CC | CC | CC | CC | CC | CC | CC | CC | îîîîîîîîîîîîîîîî |

FIG.11B

MEMORY FRACTIONATION SOFTWARE PROTECTION

CROSS-REFERENCE TO RELATED APPLICATION(S)

This application claims the benefit of priority to U.S. Provisional Patent Application No. 62/272,909, entitled MEMORY FRACTIONATION SOFTWARE PROTECTION, which was filed on Dec. 30, 2015, the disclosure of which incorporated by reference herein in its entirety.

STATEMENT REGARDING FEDERALLY SPONSORED RESEARCH OR DEVELOPMENT

This invention was made with government support under contract number FA8650-13-C-1703 awarded by the Air Force Research Laboratory. The Government has certain rights in this invention.

FIELD OF THE INVENTION

The invention relates to software protection and, more particularly, software protection that involves memory fractionation.

BACKGROUND

A possible software approach for protection systems is to move critical software and data "out-of-band" to the adversary, by using a hypervisor or running on "secure" hardware. Unfortunately, systems running this software are built using potentially untrusted commercial off-the-shelf (COTS) parts. Supply chain threats to these critical components have invalidated the assumption that we can move our critical software and data completely "out-of-band" (OOB) to the adversary, since the hardware components on which the software ultimately executes is untrusted.

Generally speaking, software solutions should be designed and built around the premise that one or more critical components in a modern computing system may be compromised or hostile. Critical systems should carry out activities without significant risk of disruption and mitigate the impact of a compromise in the presence of such threats. A silver bullet solution does not exist for these threats; however, designing a robust, scalable, solution with security properties that can be tested and validated will significantly raise the bar for our adversaries and improve overall security and robustness.

SUMMARY OF THE INVENTION

In one aspect, a method of protecting software in a computer system includes defining a memory fractionation configuration for an application software program in the computer system, fractionating at least one page of the application software program into fractions according to the memory fractionation configuration, and running the application in such a manner that, at any particular point in time when the application is running, at least a first one of the fractions is stored in a manner that is not accessible from a user space or a kernel space of the computer system.

In some implementations, one or more of the following advantages are present.

For example, software can be protected in a robust and reliable manner. Additionally, the techniques disclosed herein are relatively easy to implement. Moreover, the techniques can help thwart various types of attackers with various motives.

Other features and advantages will be apparent from the description and drawings, and from the claims.

DETAILED DESCRIPTION OF THE DRAWINGS

Figure 1:
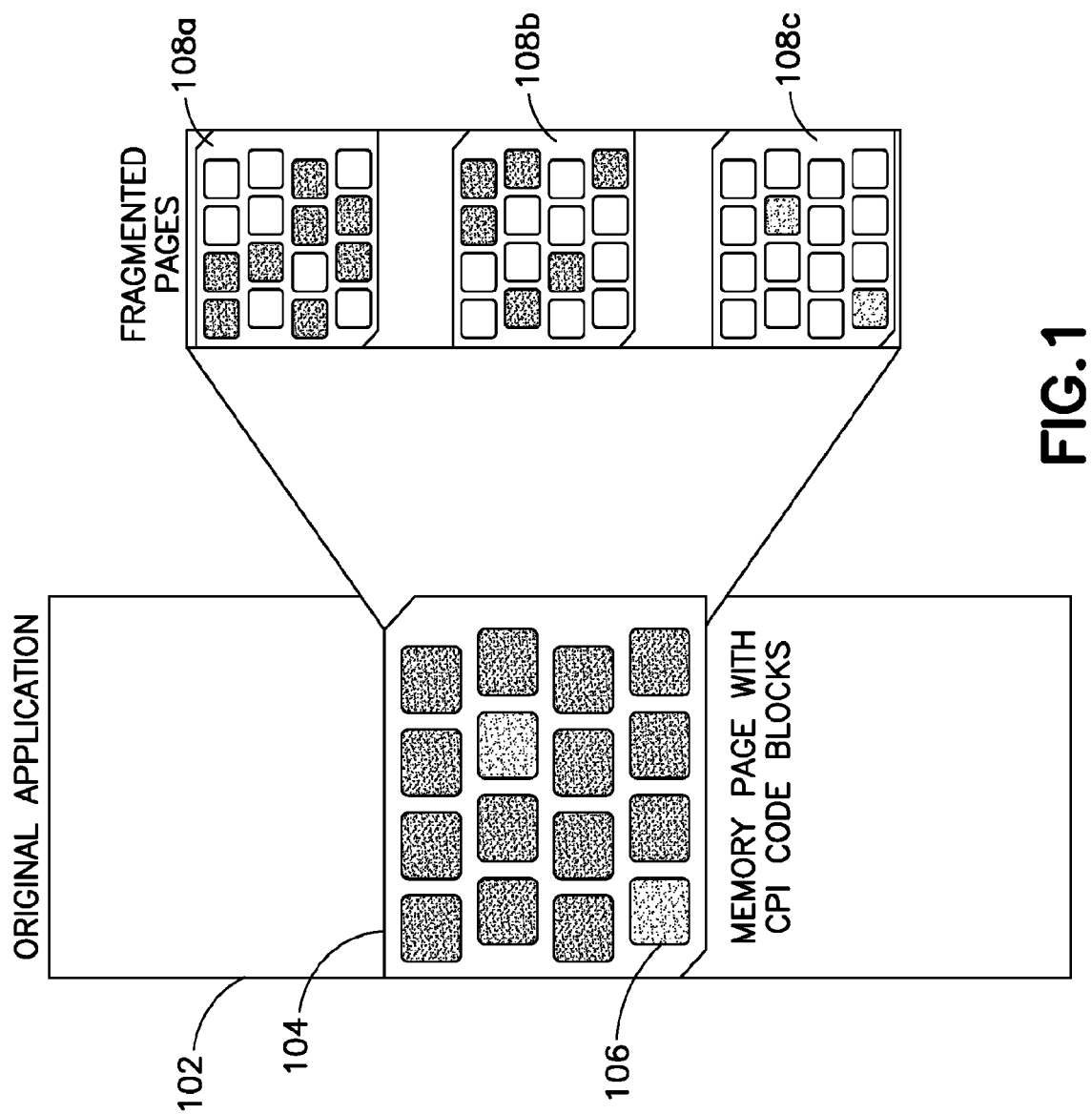
FIG. 1 is a schematic representation overview of an exemplary memory fractionation.

This disclosure relates to memory fractionation technology which allows only a partial view of a target application's memory to be accessible from user and kernel space at a single point in time as represented, for example, in FIG. 1.

FIG. 1 is a schematic overview of an exemplary memory fractionation.

The illustrated representation includes an original application 102 on the left (pre-fractionation). In a typical implementation, an original application, like the one shown in FIG. 1 would include multiple pages of code blocks. For illustrative purposes, only one such page 104 is shown in the illustrated implementation. The original page 104 has a plurality of code blocks 106, one or more of which may, at different points in time while the application is running, utilize critical program information (CPI).

According to the illustrated representation, the fractionation produces from the exemplary page 104 in the original application 102 a plurality of fragmented pages 108a, 108b, and 108c (or "views"). During this fractionation process, the code blocks 106 from the original application 104 are essentially divided between the different fragmented pages 108a, 108b, and 108c, such that each fragmented page includes a different portion (less than 100%) of the original code blocks 106 from the original application page 104. Typically, the fractionation is performed such that none of the original code blocks 106 ends up appearing in more than one of the resulting fragmented pages 108a, 108b, and 108c, and that all of the original code blocks 106 end up being represented somewhere in the resulting fragmented pages 108a, 108b, and 108c.

Although it is possible that two or more of the fragmented pages may end up being similar or identical in size, more typically, all, or most, of the fragmented pages will end up being a different size than the other fragmented pages.

In the illustrated example, only one page 104 of code blocks 106 from the original application 102 is shown being fractionated. However, in a typical implementation, multiple pages of code blocks from the original application are fractionated, with each one being fractionated according to its own distinct fractionation configuration.

Moreover, in the illustrated implementation, the fractionation process is applied within one particular page (i.e., 104) from the original application 102 such that all three of the fragmented pages 108a, 108b, and 108c that result from the represented fractionation process get their code blocks from the same page (i.e., 104 in FIG. 1). However, in some implementations, fractionation may occur in a manner that produces one or more fragmented pages, each of which gets its code blocks from different pages in the original application 102.

The illustrated implementation shows the original application page 104 being fractionated into three fragmented pages. Of course, a particular page may be fractionated into virtually any number (two or more) fragmented pages. Moreover, different pages from the same original application may be fractionated into different numbers of fragmented pages. For example, some of the pages in an original application may be fractionated into two fragmented pages, whereas other pages in the original application may be fractionated into three or more fragmented pages.

In a typical implementation, once fractionated (e.g., into multiple fragmented pages 108a, 108b, and 108c) is complete and the application is running, at any particular time, any fragmented pages that are not being used by application may hidden (e.g., not accessible) from the user space or kernel space. Moreover, in a typical implementation, while the application is running, a runtime support module provides for smooth transition between the fragmented pages ("views") while providing separation between memory spaces. In a typical implementation, the runtime support module may be a computer-based processor configured (e.g., by executable software) to perform the functionalities described herein as being attributable to the runtime support module.

In a typical implementation, the technologies disclosed herein hinder reverse engineering, software piracy/data exfiltration, and malicious alteration of critical software by protecting critical program information (CPI). CPI can range anywhere from sensitive data (SSNs, credit card numbers, trade secrets, etc.) to propriety code implementations (unique code, closed source, etc.).

Figure 2:
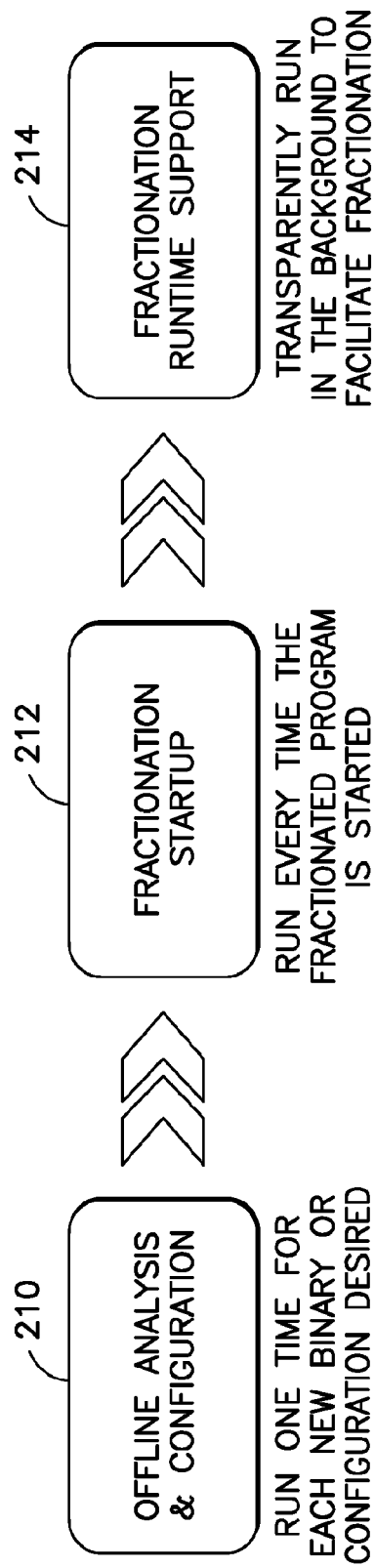
FIG. 2 is a schematic representation of a general approach of an exemplary memory fractionation.

FIG. 2 is a schematic representation showing stages in an exemplary memory fractionation process.

The first stage of the illustrated process is an off-line analysis and configuration step 210. In a typical implementation, this off-line analysis and configuration step 210 involves analyzing the CPI application and identifying basic code block information (e.g., how the application and/or its constituent pages should be divided into code blocks) and deriving a memory fractionation configuration (e.g., how the different code blocks should be assigned to different fragmented pages, i.e., which views will contain which code chunks). In some implementations, this first stage (off-line analysis and configuration) is performed by or with the assistance of a computer.

In a typical implementation, the offline analysis and configuration step 210 produces a configuration file that describes the addresses of various code blocks, and their assignments to different fragmented pages (or views). The configuration file may be stored in a computer-based memory storage device that is accessible for use when the corresponding application is launched. For any given application, the off-line analysis and configuration step 210 typically is performed only once.

The second stage of the illustrated process is a fractionation startup step 212. This is a startup routine that, in a typical implementation, would be run every time the binary for the application is loaded. This routine sets up and separates the memory space for the various fragmented pages (or views), and installs the memory fractionation runtime support module. In a typical implementation, the memory fractionation runtime support module is responsible for ensuring smooth transitioning between fragmented pages (or views) during execution of the application, while providing separation between the memory spaces.

The third stage of the illustrated process is a fractionation runtime support step 214. In a typical implementation, fractionation runtime support transparently runs in the background to facilitate fractionation during application runtime.

In a typical implementation, memory fractionation runtime support can be broken up into two pieces. The first is from the perspective of the application that was fractionated. At this point no other modifications take place at the application level. The application itself is not even aware that it is running in a fragmented way. Memory fragmenting at runtime is handled transparently by a computer-based fractionator. In a typical implementation, the fractionator may be a computer-based processor that is configured (e.g., by executable software) to perform functionalities described herein as attributable to the fractionator.

Various instantiations of this invention may be possible including, for example, implementing fractionation at: the hypervisor, the microvisor, the kernel, or the user-space levels.

Typically, tradeoffs in design of a particular system balance system performance against security/protection. For example, in order to demonstrate that memory fractionation is applicable to embedded and real-time OS (RTOS) environments, an ultra-thin microvisor (KERNEL MODULE) was developed with the following goals, which a typical implementation may achieve: 1) ease performance impact on real time operating system (RTOS) environments, 2) minimize the footprint of the fractionation runtime environment, and 3) simplify the integration process with existing systems by shrinking the code base.

Runtime support for memory fractionation can be accomplished in multiple ways and, generally speaking, is possible on any architecture that is able to throw exceptions when a particular instruction or address is executed, including ARM, x86/64, PowerPC, MIPS, etc. During the startup phase, the fractionator module registers an exception handler that is notified whenever those instructions or addresses are executed. When notified of that particular exception, the runtime module can then swaps views to permit fractionated programs to continue executing. The technique itself can be implemented at multiple layers of abstraction including at the user, kernel or hypervisor space. Depending on the architecture and layer, memory fractionation runtime support is implemented at will depending on what resources can and should be used to accomplish the task.

In some implementations, user space support is accomplished by having another more privileged application attach to the fractionation one and register to handle the exceptions associated with memory fractionation. Typically, the privileged application, in those implementations, would read/write the fractionation application's memory as needed to swap between views.

In some implementations, kernel space support uses a similar technique to user space support and has a special handler for exceptions but additionally could leverage a Memory Management Unit (MMU) to swap between views, typically providing a non-negligible performance improvement. In some implementations, the Memory Management Unit is a computer-based processor configured to execute software for performing or causing the swapping between views.

In some implementations, hypervisor support operates similarly to the kernel space implementation and also enables the possibility of fragmenting applications transparently with respect to the guest operating system (OS), for example.

Figure 3:
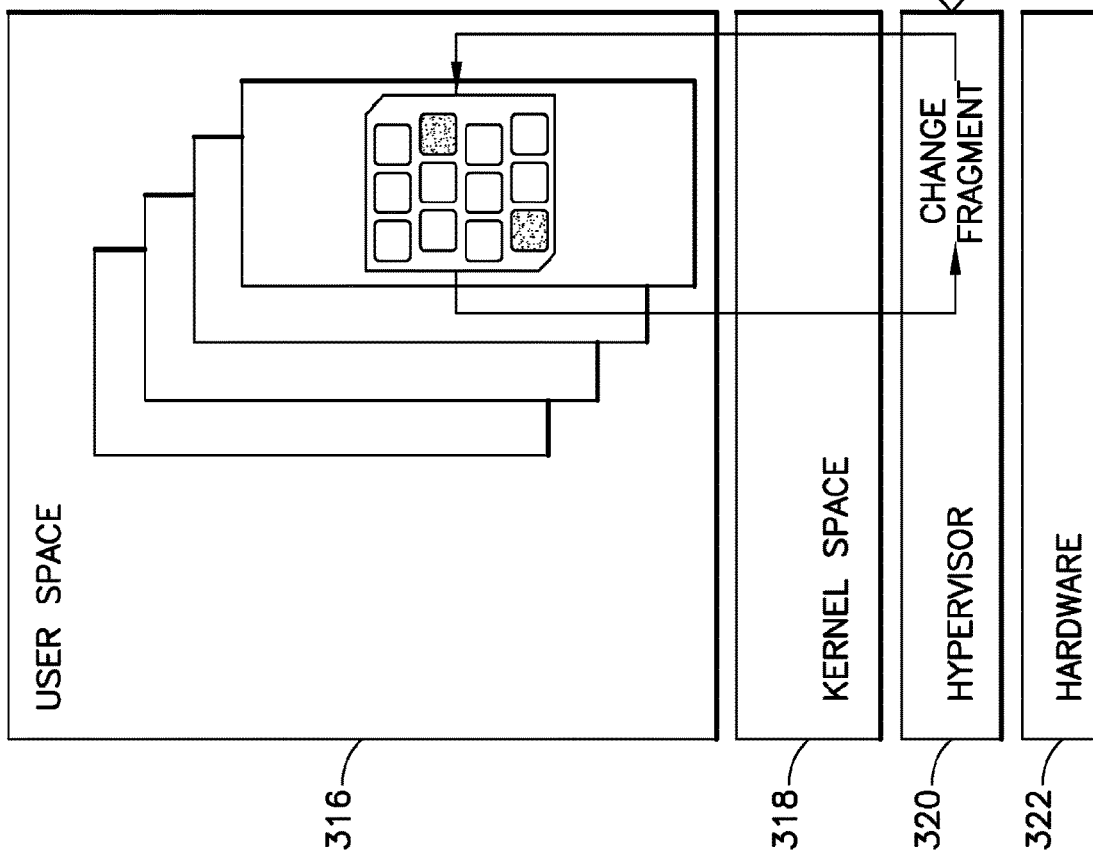
FIG. 3 is a schematic representation of an exemplary hypervisor-based implementation of memory fractionation.

FIG. 3 is a schematic representation of a computer system 300, within which an application is being executed.

The schematic representation shows a user space 316, a kernel space 318, a hypervisor 320, and hardware 322. In the illustrated example, runtime support is provided at the hypervisor. More particularly, swapping between different page fragments pages occurs at the hypervisor 320 so that, as noted in the figure, only a partial view of the application's memory is accessible from the user space 316 or the kernel space at any single point in time. At the point in time represented by the illustrated schematic, one page fragment is accessible at the hypervisor from the user space 316 and/or the kernel space 318 and two page fragments (308b and 308c) are stored in a manner that is not accessible from the user space 316 or the kernel space 318.

The schematic illustrates an exemplary interaction between the user space 316 and the hypervisor in an implementation where run time support is provided in the hypervisor space.

In a typical implementation, the application being fragmented does not need to be aware in any way that it has been fragmented. In this regard, the act of memory fractionation is substantially transparent.

The next subsections consider the perspectives of both the attacker and defender, in turn, in order to understand their motivations, goals, and possible approaches in order to provide a better description of possible threat models and the interaction between attacker and defender.

Attacker's Perspective

An attacker usually has one primary motivation: to compromise the integrity of a trusted software protection system or the data within that protected system. This may include, for example, modification of critical software, reverse engineering, software piracy, information leakage, and/or data exfiltration. Denial-of-Service (DoS) attacks generally are considered to be separate because they are largely indistinguishable from faulty hardware. While they pose a viable and concerning attack scenario, DoS attacks do not pose the same threat as attacks that surreptitiously undermine existing software protection infrastructure.

Figure 4:
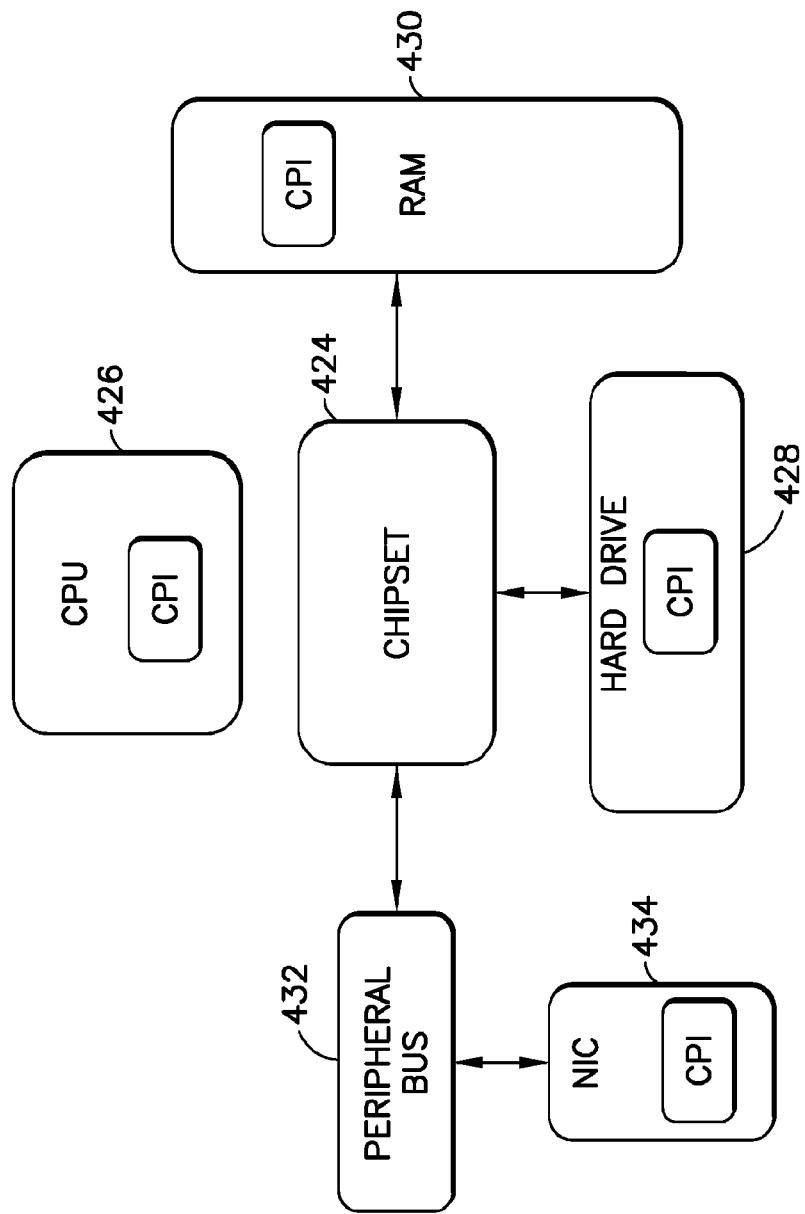
FIG. 4 is a schematic representation of an exemplary computer (PC) system, showing various possible locations of Critical Program Information (CPI) in the system.

FIG. 4 shows a schematic of a Personal Computer (PC) platform, highlighting possible locations of Critical Program Information (CPI). What is and is not considered CPI can vary from system to system. However, generally speaking, CPI should be understood to include all sensitive software and data on a system. Moreover, in some implementations, CPI may include software or data on a system that, if compromised, could cause: 1) significant degradation in effectiveness of a particular mission, 2) shorten an expected effective life of a system, 3) reduce technological advantage, 4) significantly alter a program's direction, 5) enable an adversary to defeat, counter, copy, reverse engineer a technology or capability, or 6) expose secret, confidential, personal or otherwise proprietary information from the system.

The illustrated system has a chipset 424 with a central processing unit (CPU) 426, a hard drive 428, random access memory (RAM) 430, a peripheral bus 432, and a network interface controller (NIC) 434. According to the illustrated representation, CPI may be present in at least the CPU 426, the hard drive 428, RAM 430 and/or the NIC 434. For example, CPI is stored on the hard drive and loaded into Random Access Memory (RAM) and the Central Processing Unit (CPU) when executing. If network access is required, CPI may be sent to the Network Interface Card (NIC) for transmission over the wire. The attacker's goal may be to access or modify the CPI in one or more of these (or other) locations on the system. Any such attack may require the attacker to have the ability to locate the CPI within the system (e.g., on the hard drive 428, in RAM 430, or while executing on the CPU 426), read the CPI in its raw format (e.g., stripped of any encryption) and potentially modify it. At the hardware level these tasks are not trivial to perform for several reasons.

One such difficulty is that a semantic gap exists between hardware and software. Generally speaking, hardware operates at a very fine granularity, modifying individual bits and bytes. Moreover, software contains all of the abstractions that turn these bits and bytes into something meaningful. The semantics used by the software to infer meaning behind these low-level actions contain important information regarding the system state. In order for a hardware attack to succeed in locating and modifying a specific piece of software or data on the system, it usually must tediously reconstruct a significant portion of the software semantics. It has been shown that this so called semantic gap is a significantly limiting factor when designing low-level software such as bare-metal hypervisors. Similar challenges may be by an attacker trying to leverage malicious hardware modifications.

Additionally, typical modern computing platforms are essentially systems of subsystems, with components such as hard drives, chipsets, and peripheral cards containing their own embedded CPU, non-volatile storage, RAM, and/or firmware/microcode. An attacker can modify one or more of these components within a particular device; however that device itself has limited interaction with the rest of the system. Devices generally are connected via a series of busses, each with its own limited specification for communication. These busses act as funnels, limiting the types of interaction devices can have with the rest of the system. If an attacker wants a malicious hardware modification within a device to affect other parts of the system, it generally must act within the bounds of the communication mechanisms exposed via the bus it is connected to. For devices such as hard disks, peripheral cards, and motherboard components, these communication methods are port Input/Output (I/O) and Direct Memory Access (DMA). Subsystems, while more restrictive in their ability to interact with the rest of the system, sometimes can be used to gain a foot hold and used to compromise another parts of the system.

Defender's Perspective

A defender's goal usually is to keep the CPI safe and ensure that attacks levied via modified hardware fail to disrupt the mission. While protecting against such a threat can be a daunting task, the defender may have at least one distinct advantage: control of the dynamic system state. The approach leverages this advantage, as well as our analysis of the attacker's goals and techniques, to make the attacker's tasks substantially more complex resulting in an increased detectability threshold (due to the amount of hardware/firmware modification necessary) or a substantial reduction in the likelihood/impact of a successful attack.

The defender generally needs to address a variety of attack classes. An ideal solution would provide perfect protection against all attack classes. In some cases, however, this is infeasible due to at least limitations of COTS hardware systems. In those cases where perfect protection is impossible, or impractical, the goal might be to raise the bar substantially and to reduce the attack surface. Generally speaking, the attack surface in a computer-based environment may be considered the sum of the different points (the "attack vectors") where an unauthorized user (i.e., the "attacker") can try to enter data to, access data, or extract data from the environment. Examples of attack vectors can include user input fields, protocols, interfaces and services. In some implementations, reducing the attack surface can be accomplished by taking the executable to be protected and fragmenting it in a well-defined manner so that each component runs in isolation.

How Memory Fractionation Protects Against Hardware Trojans

Generally speaking, a hardware Trojan is a malicious modification of circuitry of in an integrated circuit. A hardware Trojan usually is characterized by its physical representation and its behavior. The payload of a hardware Trojan may be the entire activity that the Trojan executes when it is triggered. In general, malicious Trojans try to bypass or disable a security fence in a system: It can leak confidential information by radio emission, for example, and also disable, derange or destroy an entire chip or components of it.

Memory fractionation generally is not meant to detect backdoors or in any way restrict/counter the ability for a hardware Trojan to be triggered or run to completion. In a typical implementation, however, memory fractionation does "significantly raise the bar" for an attacker to successfully complete its mission in the presence of a hardware Trojan. Consider a hardware Trojan that provides an unrestricted view of a system's RAM and wants to access the CPI of a fragmented application. All of the CPI is still in memory but is disjoint and not clearly identifiable. By dividing the CPI and distributing it among a larger disjoint memory space, finding pieces and reassembling them becomes an increasingly challenging task. Moreover, memory fractionation adds a temporal aspect that the attacker will need to overcome in addition to all the existing protection mechanisms.

Figure 5:
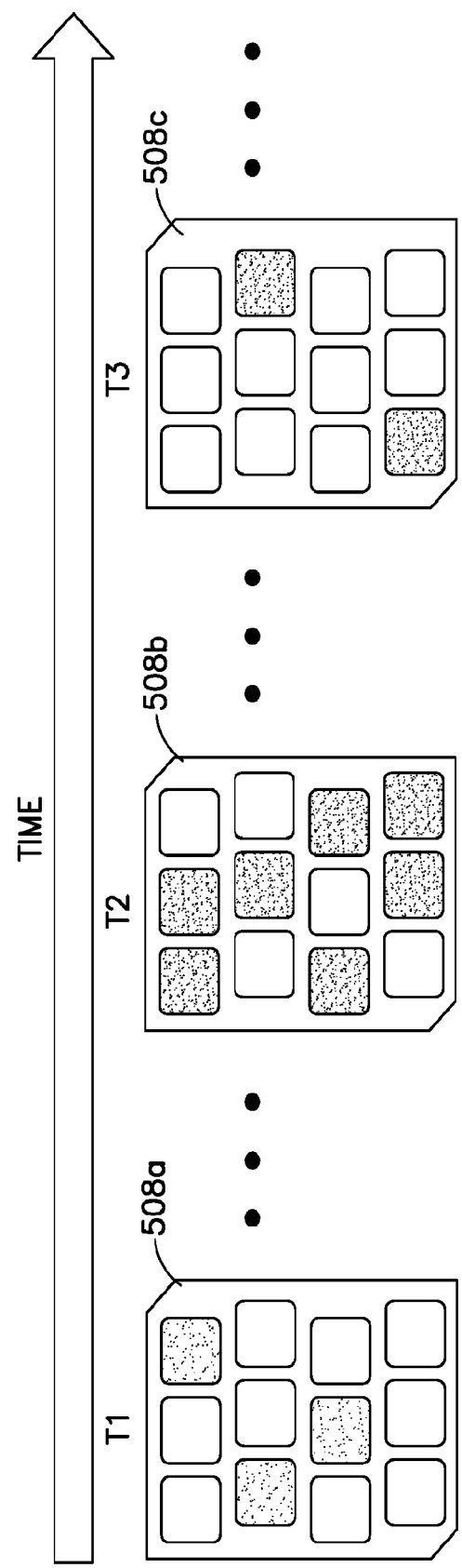
FIG. 5 is a schematic representation showing an exemplary time sequence of page fragments that are exclusively accessible to a user space or kernel space at different points in time according to an exemplary implementation.

FIG. 5 is a schematic representation of temporal aspects associated with some of the memory fractionation techniques disclosed herein.

More particularly, the illustrated representation shows a sequence of different fragmented pages 508a, 508b, and 508c that are made available to the user space or kernel space in a computer system over time. For example, according to the illustrated implementation, at time T1, only fragmented page 508a is accessible from the user space or kernel space, and fragmented pages 508b and 508c are not accessible from the user space or the kernel space. Subsequently, at time T2, only fragmented page 508b is accessible from the user space or the kernel space, and fragmented pages 508a and 508c are not accessible from the user space or the kernel space. Next, at time T3, only fragmented page 508c is accessible from the user space or the kernel space, and fragmented pages 508a and 508b are not accessible from the user space or the kernel space.

Again, in a typical implementation, each fragment page (i.e., 508a, 508b and 508c) may be a different size than the others. Typically, the size and specific code block contained in each fragmented page is based on how much security is desired and how many processing resources can be applied to achieving that security.

Typically, if an attacker is merely trying to reconstruct the CPI they will either need to brute force search memory and try to match which views need to be merged with some heuristic or take snapshots of the applications memory over time and try to reconstruct the CPI. If the attacker wishes to modify the CPI they still need to find the CPI of interest. If the act of finding the CPI uses a signature based approach, then memory fractionation may end up splitting the signature across multiple views and as such the attacker may not find a match without having to deal with reconstructing the signature. If the attacker blindly patches an address, they may patch the right address but in the wrong view, resulting in a patch that has no effect.

To make the situation worse for the adversary, view layout could be randomized across different runs of the application. An attacker may collect information on the view layout for a fractionated program only to find that subsequent runs use different view layouts. This random element makes it impossible for the attacker to rely on a specific view layout when crafting an attack. It is also possible that multiple views contain the correct chunk of code. In that case, multiple views can be used interchangeably by the system, making it difficult for an attacker to predict which view will be present at any given time or to force a particular view to appear by altering program execution.

System Architecture Design

This section describes the design of one implementation of a memory fractionation system. Generally speaking, the approach of memory fractionation includes taking code chunks from a given application, breaking them up and distributing them among multiple locations. In a typical implementation, this prevents a Trojan in any single location in the system from having too much information or influence over the application. Memory Fractionation can be applied to an entire executable, or to a subset of the code within the executable. In some instances, the developer can specify a function within an executable as the starting point for applying memory fractionation and all the code within the binary that is in that function, or called by that function, will be fragmented. In a typical implementation, system calls and library functions will not be fragmented. This can allow the techniques described herein to work with existing binaries, libraries, and systems. If memory fractionation of libraries is desired, the memory fractionation technique generally is applied to each library independently.

Offline Analysis & Configuration

This stage occurs before a fractionation application is deployed and can result in a single memory fractionation configuration or a set of them that can be cycled through in later stages. Memory Fractionation can be applied to an entire executable, or to a subset of the code within the executable. The extent and granularity to which an executable is fragmented can be adjusted to balance the need for both security and performance. This stage may produce a configuration file, for example, that describes how an application should be fragmented. The configuration itself can be generated in multiple ways depending on the amount of information available about the application/CPI that needs to be fragmented. For example, in order to support legacy applications where source code is unavailable, manual analysis, primitive function selection and static analysis may be conducted. In another case were source code is available, the application may be instrumented and analyzed in a more automated and dynamic fashion.

In order to understand the performance tradeoffs, it is helpful to consider how the application's control flow may be impacted by memory fractionation.

Figure 6:
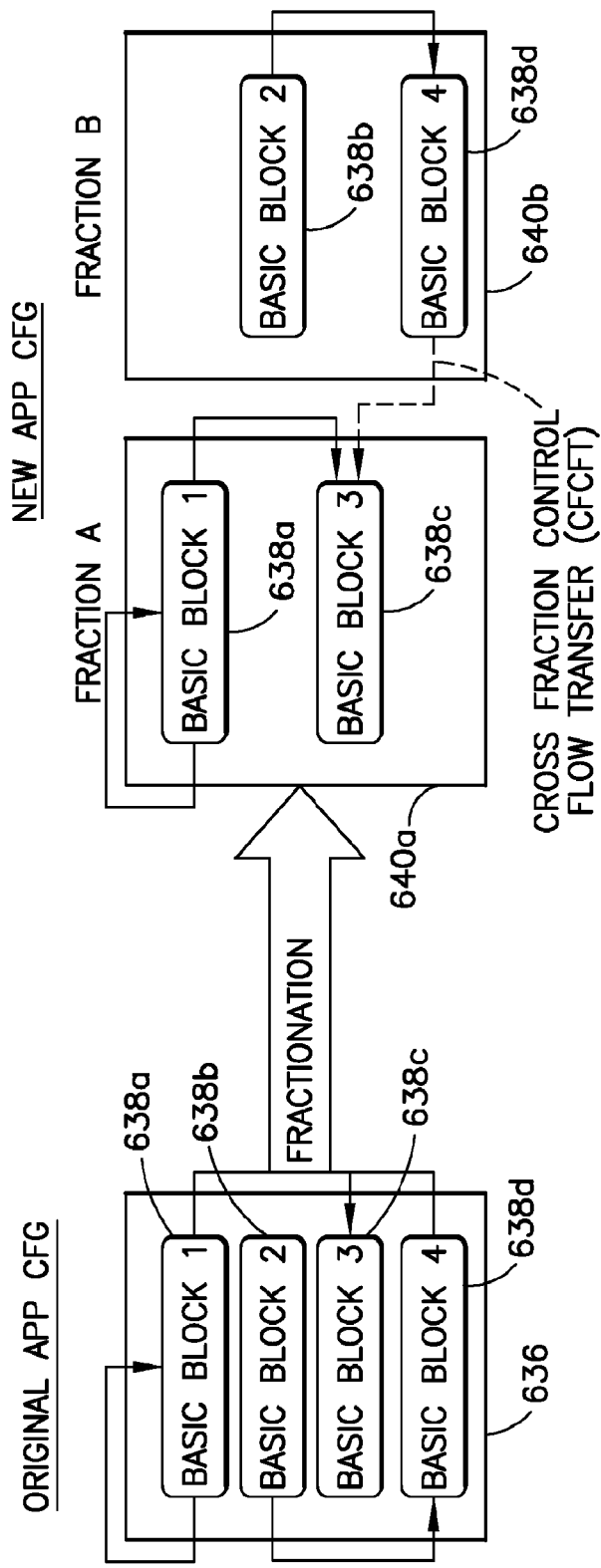
FIG. 6 is a schematic representation showing one example of a memory fractionation in a Control Flow Graph (CFG) format.

To assist with this consideration, FIG. 6 is a schematic representation showing one example of a memory fractionation in a Control Flow Graph (CFG) format.

The illustrated schematic shows an original application 636 (prior to fractionation) that includes four basic blocks of code 638a, 638b, 638c and 638d. The control flow for the original application includes a flow that loops from basic block 1 (638a) back to itself, a flow from basic block 1 (638a) to basic block 3 (638c), a flow from basic block 2 (638b) to basic block 4 (638d), and a flow from basic block 4 (638d) to basic block 3 (638c).

During fractionation, the illustrated original application 636 can be split up in any number of a variety of ways. For example, during fractionation, the original application could be split into two, three or four fragments. If the original application were to be split in two, then the two fragments could have the same number of basic blocks (i.e., two each) or different numbers of basic blocks (i.e., one and three). If the original application were to be split in three, then one of the fragments would have two basic blocks, while the other fragments would have one basic block. If the original application were to be split in four, then each fragment would have one basic block.

The particular fractionation scheme/configuration represented in FIG. 6 splits the original application 636 into two different fragments/fractions—referred to as fraction A (640a) and fraction B (640b) in the illustrated figure. According to the illustrated example, fraction A (640a) has basic block 1 (638a) and basic block 3 (638c), and fraction B has basic block 2 (638b) and basic block 4 (638d).

The control flows of the original application are equally applicable to the fragmented version of the application (represented by fractions A and B), and are shown in the fragmented version of the application, too. In particular, the fragmented version of the application (represented by fractions A and B) includes one flow that loops from basic block 1 (638a) back to itself, a flow from basic block 1 (638a) to basic block 3 (638c), a flow from basic block 2 (638b) to basic block 4 (638d), and a flow from basic block 4 (638d) to basic block 3 (638c).

From this, it can be seen that the particular fractionation scheme/configuration results in only one cross fraction control flow transfer. That is, only one flow goes from one fraction to the other (i.e., from basic block 4 (638d) in fraction B to basic block 3 (638c) in fraction A). This means if the original application were fractionated as indicated in FIG. 6, then, as shown in FIG. 6, the flow transfer from basic block 4 to basic block 3 would require a shift in access from fraction B to fraction A. Other fractionation schemes may result in more than one cross fraction control flow transfers. Understanding the number (and expected frequency) of cross fraction flow transfers in different fractionation schemes/configurations can facilitate a more efficient and effective design of fractionation configurations.

Figure 7:
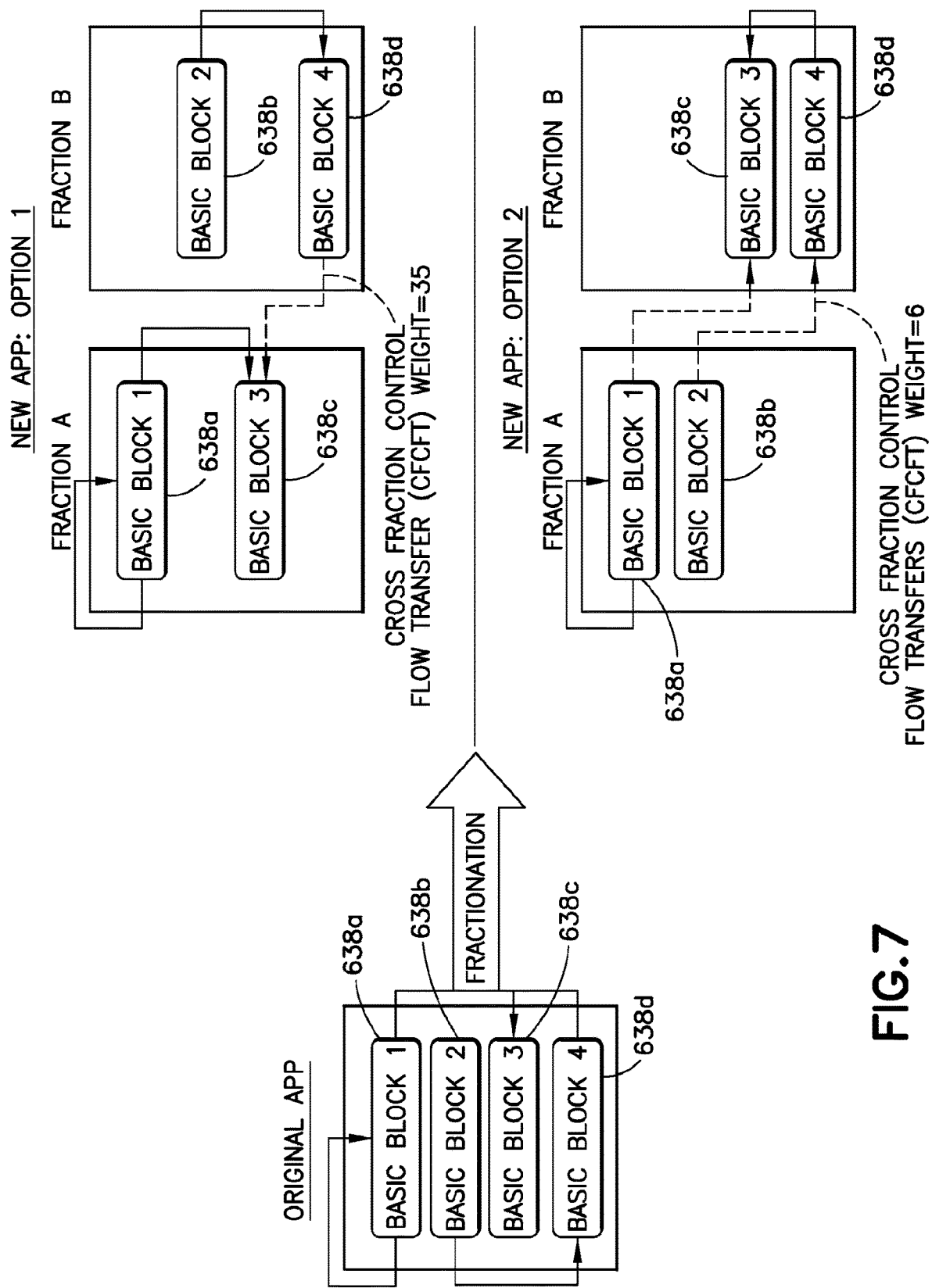
FIG. 7 is a schematic representation showing two exemplary memory fractionation options, with resulting fragments for each option shown in a weighted Control Flow Graph (CFGs) format.

FIG. 7 is a schematic representation showing two options for possible memory fractionation configurations (Option 1 and Option 2) for the original application of FIG. 6 in a Control Flow Graph (CFG) format.

Option 1 is similar to the configuration shown in FIG. 6 and discussed above. In this option, there is only one cross fraction control flow transfer—the one that goes from basic block 4 (638d) in fraction B to basic block 3 (638c) in fraction A. Moreover, in the illustrated representation, weights are applied to each flow. One way of calculating these weights is to make the weights correspond to the number of times that each particular transfer is observed during a sample run of the application (or an average across a set of sample runs). In the illustrated example, a weight of 23 was assigned to the flow that loops from basic block 1 (638a) back to itself, a weight of 1 was assigned to the flow from basic block 1 (638a) to basic block 3 (638c), a weight of 5 was assigned to the flow from basic block 2 (638b) to basic block 4 (638d), and a weight of 35 was assigned to the cross-fractional flow from basic block 4 (638d) to basic block 3 (638c).

Option 2 in FIG. 7 includes two fractions—again, labeled fraction A and fraction B. According to option 2, fraction A includes basic block 1 (638a) and basic block 2 (638b), and fraction B includes basic block 3 (638c) and basic block 4 (638d). In option 2 there are two cross-fraction control flow transfers (CFCFT)—a first CFCFT from basic block 1 in fraction A to basic block 3 in fraction B, and a second CFCFT from basic block 2 in fraction A to basic block 4 in fraction B. The same weights are assigned to the different flow transfers in options 2 as in option 1.

In comparing option 1 to option 2, special attention may be paid to control flow transfers that cross the view boundary (i.e., the CFCFTs and their associated weights). While control flow between blocks within a single view happen naturally (as they do in the original application), special attention must be taken by the runtime memory fractionation system in order to properly transfer control between views. The specifics of how this works are implementation specific and discussed in the prototype section. However, discussing the generalized concept allows for some interesting, critical observations regarding the memory fractionation decisions. Specifically, in a typical implementation, it is desirable to minimize the Cross Fraction Control Flow Transfers (CFCFT), because the overall performance of the system will largely be dependent on: 1) the number of CFCFTs in the new version of the application CFG, 2) the frequency of execution through CFCFT paths, and 3) potential cache/Translation Lookaside Buffer (TLB) impacts resulting from memory fractionation.

Therefore, to achieve good performance, in a typical implementation, the number of CFCFTs in the CFG should be minimized, and/or the frequency of their execution at runtime should be minimized. The decisions regarding code chunk groupings in each view can impact these values. Using these weights, various memory fractionation options can be evaluated and compared, as shown in FIG. 7.

In the example demonstrated in this figure, Option 1 has a single CFCFT edge; however that edge has a large weight value (meaning that it is executed very frequently). Therefore, a more efficient partitioning is shown in Option 2, which has a larger number of CFCFT edges, but they have lower weight values (indicating that they are executed infrequently). Partitioning the CFT this way can be accomplished using minimum flow/max cut algorithms (similar to the network theory algorithms which find bottlenecks in connected networks) which specifically find the partitioning between graph nodes that minimizes the flow between partitions.

Offline Analysis & Configuration

Figure 8:
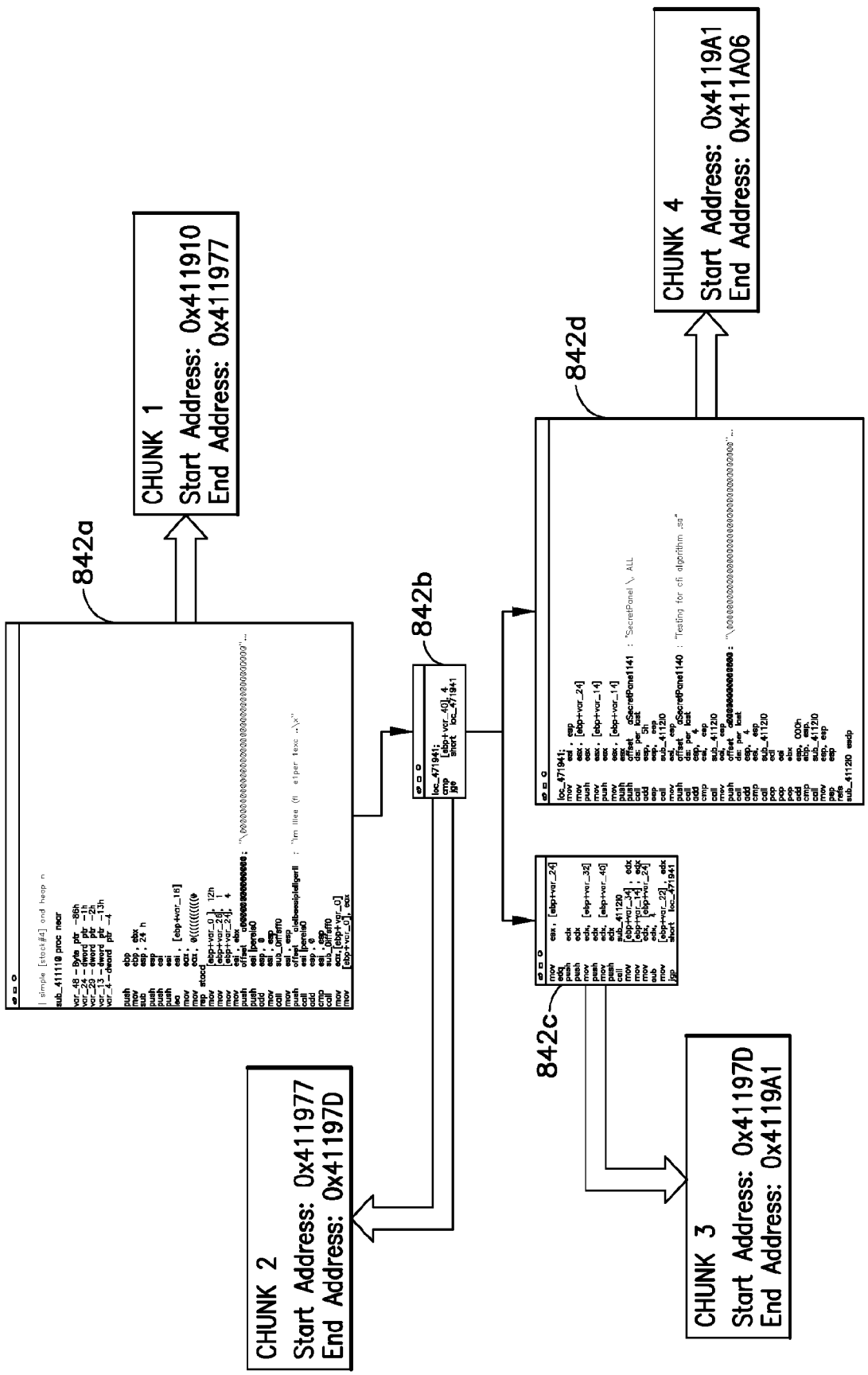
FIG. 8 is an overview of an exemplary offline analysis & configuration overview for memory fractionation.

A typical goal of the offline analysis and configuration step (e.g., 210 in FIG. 2) is to generate a configuration file describing the addresses of various protected code chunks, and their assignments to different views (or fractions), as shown, for example, in FIG. 8.

In the example of FIG. 8, the application code in question is split into four chunks—chunk 1 (842a), chunk 2 (842b), chunk 3 (842c), and chunk 4 (842d). Each chunk in the illustrated example is a different size than the other chunks. Chunk 1 has a start address of 0x411910 and an end address of 0x411977. Chunk 2 has a start address of 0x411977 and an end address of 0x41197D. Chunk 3 has a start address of 041197D and an end address of 0x4119A1. Chunk 4 has a start address of 0x4119A1 and an end address of 0x411A06. In a typical implementation, the configuration file, produced in the offline analysis & configuration step, would include each of these start addresses and end addresses. Moreover, in a typical implementation, the configuration file, produced in the offline analysis & configuration step, would identify which one of multiple views (or fractions) each chunk is assigned to.

The configuration step can incorporate various sources of information on the application into a configuration file. Depending on the amount of information available and the priorities of the task, different configuration files can be produced for the same application. A set of configuration files may be desirable to ensure that multiple instances of the application have different configurations, making it harder to reverse engineer or exploit. Another use for multiple configurations is to cycle through them dynamically, changing the fractions, to further increase the burden on an attacker.

To demonstrate this flexibility, a static analysis approach was accomplished via two methods: a custom Ida Pro script and a custom Rust program that leverages the Capstone disassembly library with a web based user interface (UI). Neither approach is perfect; each has its own set of benefits and limitations. Generally speaking, the approach taken to produce the configuration file will depend on what is information is available about the application. Typically, the configuration file produced in either case is the same. Each entry in the configuration file is used to identify which chunks need to be excluded from which view. While the concept of excluding may seem counter intuitive it is actually easier to exclude chunks from a view than needing to describe everything that is required in a particular view. The premise is that all views will start with a copy of the original code.

Other instantiations may use a dynamic analysis framework to profile the application in order to generate the fractionation configurations. Such a dynamic analysis engine may be used to examine and extract basic block information from an executable and requires only minor (if any) modifications to an application's source code.

Dynamic Analysis Approach

Figure 16:
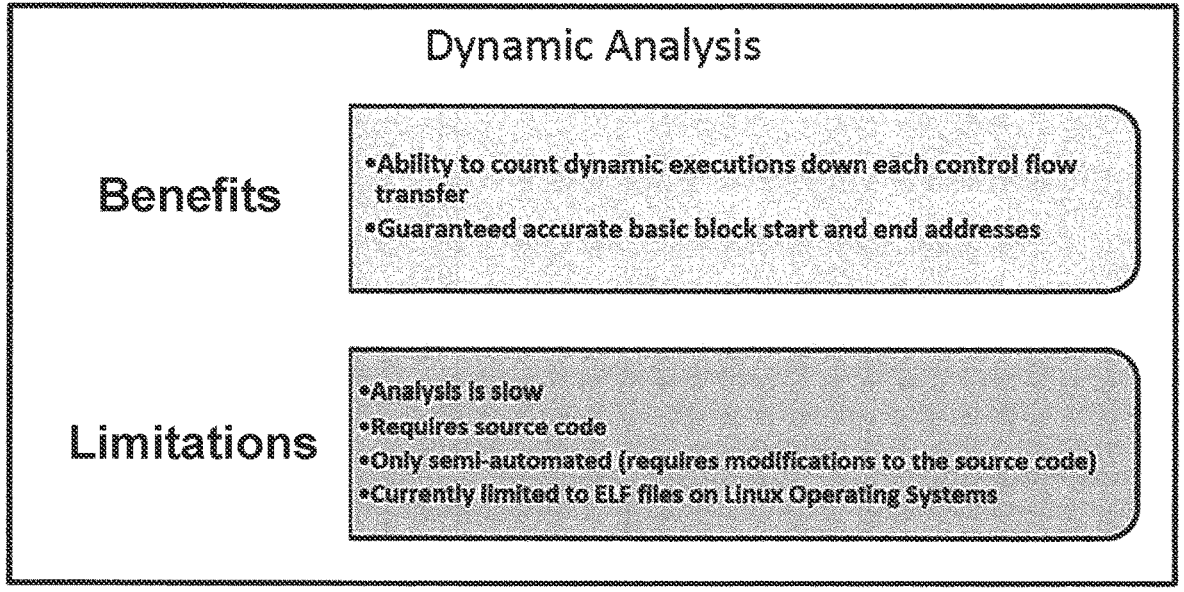
FIG. 16 is a list of some benefits and limitations of a dynamic analysis approach.

The symbolic (dynamic) analysis approach has several benefits. It is able to accurately identify basic blocks. It can be augmented to count the dynamic execution instances of each block. This information can be useful for optimizing the assignment of code blocks to views, as discussed in the System Architecture Design section. Specifically, rather than random assignment of code blocks to views, an algorithm can be used that attempts to minimize the performance impact of CFCFTs by grouping frequently executed block transfers into the same view. Some benefits and limitations of a dynamic analysis approach are outlined in FIG. 16.

Static Analysis Approach

While the symbolic analysis approach described above has many benefits, it also has drawbacks and limitations. Thus, another approach to produce the necessary configuration is provided. A disassembly library can be used to statically analyze the executable and produce a configuration file without the source code. Configuration tools built around two widely-used disassembly libraries, Ida Pro and Capstone, have been developed for this purpose.

Figure 17:
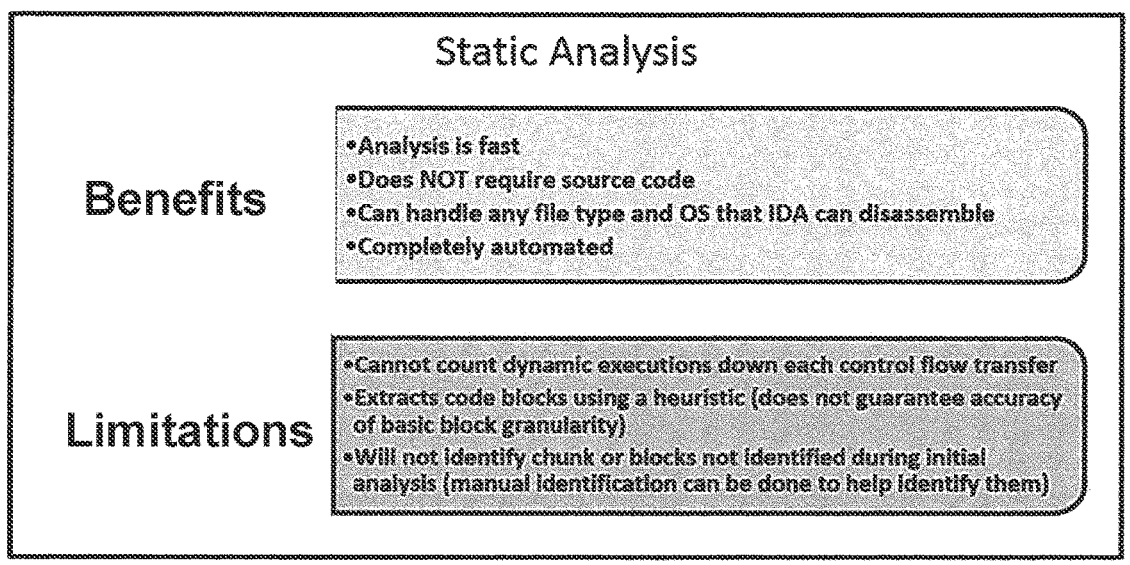
FIG. 17 is a list of some benefits and limitations of a static analysis approach.

Some benefits and limitations of a static analysis approach are outlined in FIG. 17.

Ida Pro Disassembler

The Ida Pro Configuration Tool (ICT) can be used to perform static analysis of the executable. While there is no easy way to directly extract basic block information from the disassembly tool, it is possible to extract information regarding "function chunks", which are executable code blocks automatically identified by the tool and may contain more than one basic block. The ICT uses an Ida Python script to traverse all the function chunks in the executable and print out their start and end addresses. A random view id is then appended to each chunk to help produce the configuration file. With some minor modifications, the script could be changed to examine every instruction within a chunk, to identify all of the control flow transfer instructions, and then to split the chunk into multiple basic blocks at those points.

Generally speaking, the ICT tool is composed of three main components; a Pre-Processing Component, a Processing Component, and a Post-Processing Component. Each component applies a series of algorithms for producing an optimal configuration file for the executable. A graphical user interface (GUI) allows an operator to customize and apply algorithms at each stage to meet performance and security requirements (shown, for example, in FIG. 9).

The Pre-Processing component gathers data pertaining to the selected file and hands that information to the processing component. This component uses an Ida Python script to take a binary file and disassemble it to extract the program operation at the assembly level including instructions, blocks, functions, and references. The script uses the IDA API to gather the functions used within the application then breaks those down into basic blocks.

The Processing component runs extracted data through a series of algorithms which intelligently determine significant characteristics of the binary file being assessed. This stage is designed modularly, allowing for additional algorithms that extend processing capabilities.

The Post-Processing component assigns chunks to appropriate views based on the findings of the processing stage. This stage also performs cleanup of chunks generated by prior processing techniques, validates resulting layouts, and generates the resulting XML file(s).

Figure 9:
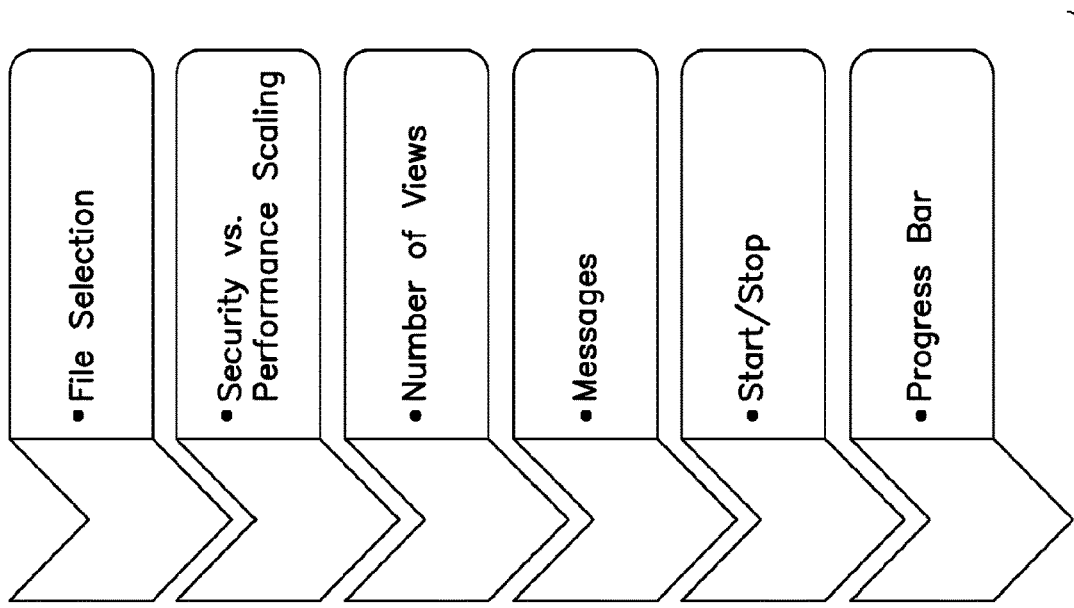
FIG. 9 is a screenshot of an exemplary Ida Pro configuration tool graphical user interface (GUI) usable in connection with memory fractionation.
Figure 9:
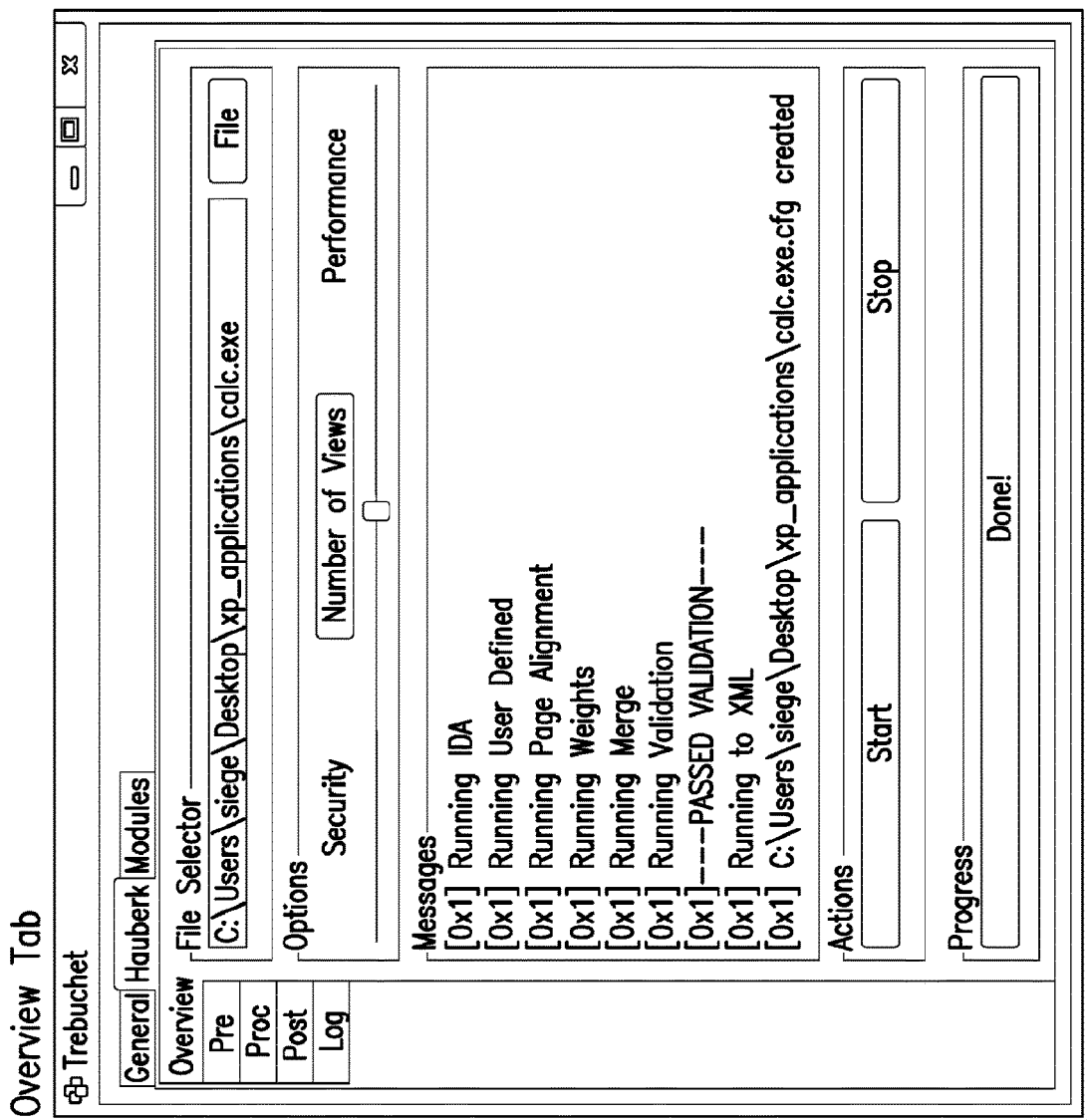

FIG. 9 is a screenshot of an exemplary Ida Pro configuration tool graphical user interface (GUI) usable in connection with memory fractionation.

The illustrated screenshot provides for file selection, security vs. performance scaling, number of views, messages, start and stop actions and a progress bar.

Capstone Disassembly Library

Capstone is a disassembly library that has a common interface to support disassembly of ARM, PowerPC, and x86 binaries. The Capstone tool uses low level virtual machine (LLVM's) headers for disassembly, which is generally the first-pass location when opcodes are added to architectures. The Capstone tool is very fast and supports most architectures LLVM does. While the Capstone tool generally has a more comprehensive understanding of opcodes than IDA, it generally does not have any semantic understanding like IDA.

However, the Capstone tool does not include a way to parse file formats. A custom library 'execfmf' was developed to parse PE and ELF files. Execfmt allows loading the major file formats used on modern operating systems that fractionation supports. Execfmt is implemented using a generic interface to concrete implementations for each filetype (represented as a struct). A generic 'parse' function takes a reader and returns a trait object (polymorphic) of the underlying file format, or nothing if it cannot be parsed as any format.

The Capstone Configuration Tool (CCT) is written in Rust, which compiles to a native executable while providing a rich standard library. The CCT primarily uses two algorithms to analyze the executable: frequency of reference and code complexity. Both use the same information from instructions (e.g., potential jump addresses, if any), but in different ways. For frequency of reference, for each jump seen, the page that is being jumped to gets an extra score. For code complexity, each non-jump instruction adds a score to the containing page, and each jump subtracts from that score; this gives a rough ratio of flow control to arithmetic in a page. The scores are multiplied together to create a final score for the page. The scores are used relative to the scores for other pages in the program to determine a standard deviation from a user-provided mean (default 256) for the size of chunks in that page.

After a score is assigned and the parameters for a standard distribution computed, the algorithm establishes a thread pool (1 thread per logical CPU) and dispatches pages to the workers. For each page, the distribution is sampled a fixed (source constant) number of times for chunk sizes. A list of instructions within the current page is built. Then, the list of chunk sizes is iterated repeatedly, trying to find a chunk size that will end on an instruction (so as not to fractionate within an instruction); when it is not found, the view number of the smallest chunk is used to create a chunk that will fill the rest of the page. The results of all the workers are aggregated; this is a list of instruction-belongs-to-view information. After generating the final chunk list in the correct format, it is written to XML statically.

The CCT is generally designed to avoid generating edge cases or possible failure cases, where a chunk crosses a page boundary, as the assignment algorithm works by choosing instructions within a page. It was hypothesized that the uniqueness of individual chunks is a potential discriminating factor that could aid a reverse engineer. To combat this, the configuration tool determines a chunk size based on a normal distribution guided by the operator defined average chunk size. The average chunk size was determined to be the most impactful variable affecting performance due to cross fraction page swaps.

Figure 10:
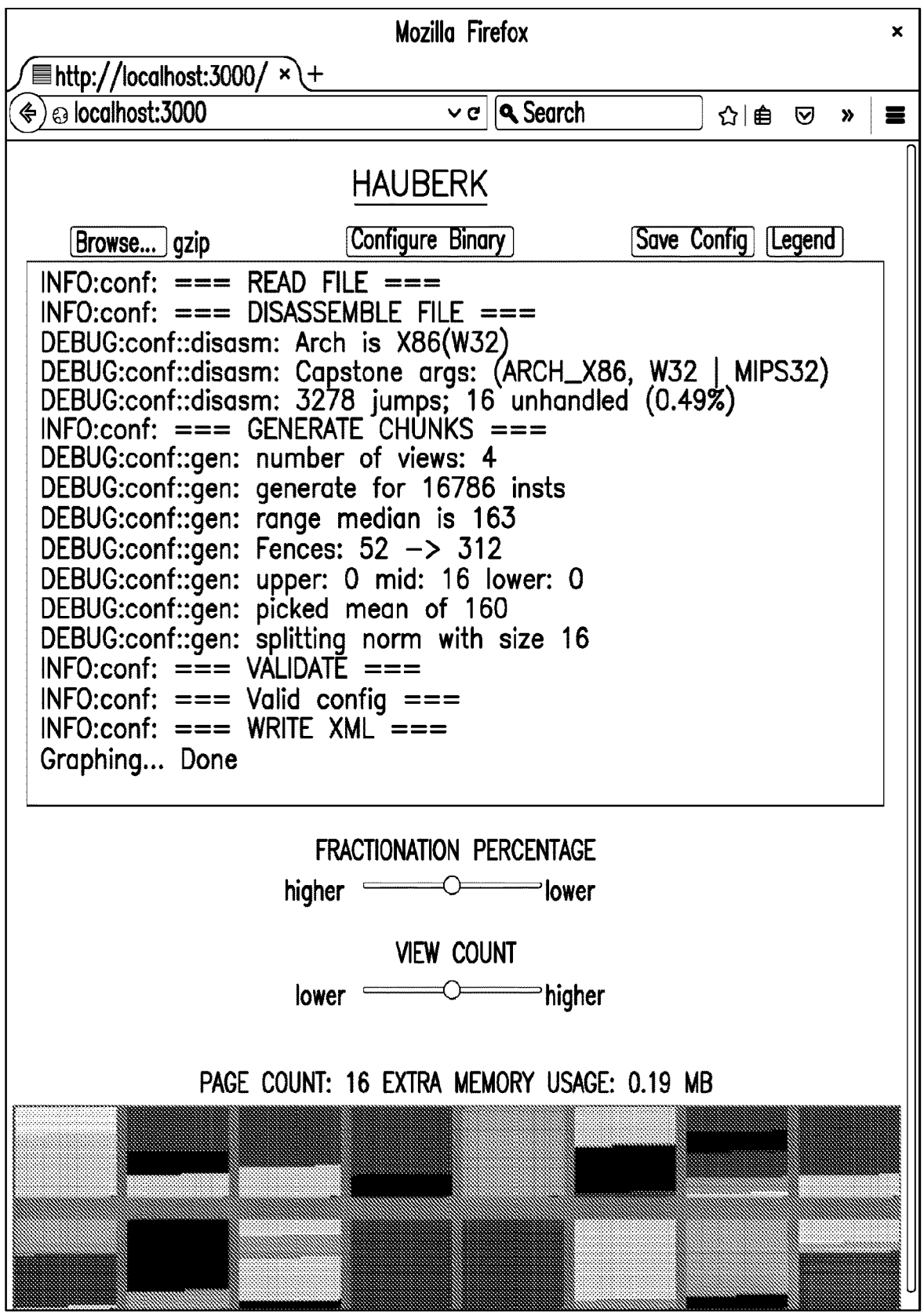
FIG. 10 is a screenshot of an exemplary configuration of a web-based user interface (UI) for memory fractionation.

An exemplary web based user interface (UI), shown in FIG. 10, for the CCT was developed to allow the operator to browse to and select the target program to be fractionated, configure the binary, and save the resulting configuration.

Upon completion of the configuration and analysis step, the web based UI shows the impact of fractionation on the memory layout of the target program. Specifically, the web-based UI includes a color-coded, visual representation of fractionated pages at the bottom of the page. Each color in the illustrated representation corresponds to a different 'view' (or fraction) and each square shows a collapsed representation of all 'views' for the original page. The web UI thus provides a comprehensive view of a fractionated program. It generates a sequential array of the pages of a program, overlaid with the "views" of memory, and calculates the approximate memory usage for a given configuration. Above the illustrated representation is a page count and extra memory usage due to the fractionation. As input, the user provides an executable file for config file generation, and can adjust the number of views swapped on a per page basis.

The illustrated UI has two, user-adjustable sliders, one of which enables the user to adjust the fractionation percentage (making it higher or lower) for the application in question, the other of which enables the user to adjust the view count (making it higher or lower) for the application in question. Adjusting these values (with the provided slider) has the possibility, in a typical implementation, of increasing or decreasing security and system performance.

Memory Fractionation Startup

In a prototype, memory fractionation startup happens from inside of the application that is to be fragmented. In a typical implementation, this step begins by launching a fractionator, which is responsible for managing and swapping between views of the application. The fractionator can be implemented at different levels including user space, kernel space, or hypervisor level. When starting application, configuration information generated in the previous step is sent to the fractionator. In a typical implementation, the fractionator also performs any registration required to swap pages when needed. For example, the hypervisor registers to be notified whenever a debug trap instruction is executed.

Using this configuration, in a typical implementation, the fractionator separates the memory space as follows. For each page of memory containing fragmented code, multiple physical memory pages are allocated in RAM, one for each view (or fraction). In a typical implementation, the pages are all initialized with an exact copy of the original corresponding page from the application. Then the code blocks are removed from each view as specified in the configuration, until each view contains only the code blocks not described in the configuration. When code blocks are removed, they can be replaced with special trap or undefined instructions which transfer control to the fractionator when executed. However, the special instructions are not required to implement memory fractionation; any mechanism that signals the fractionator when a view swap is required can be used instead.

Figure 11C:
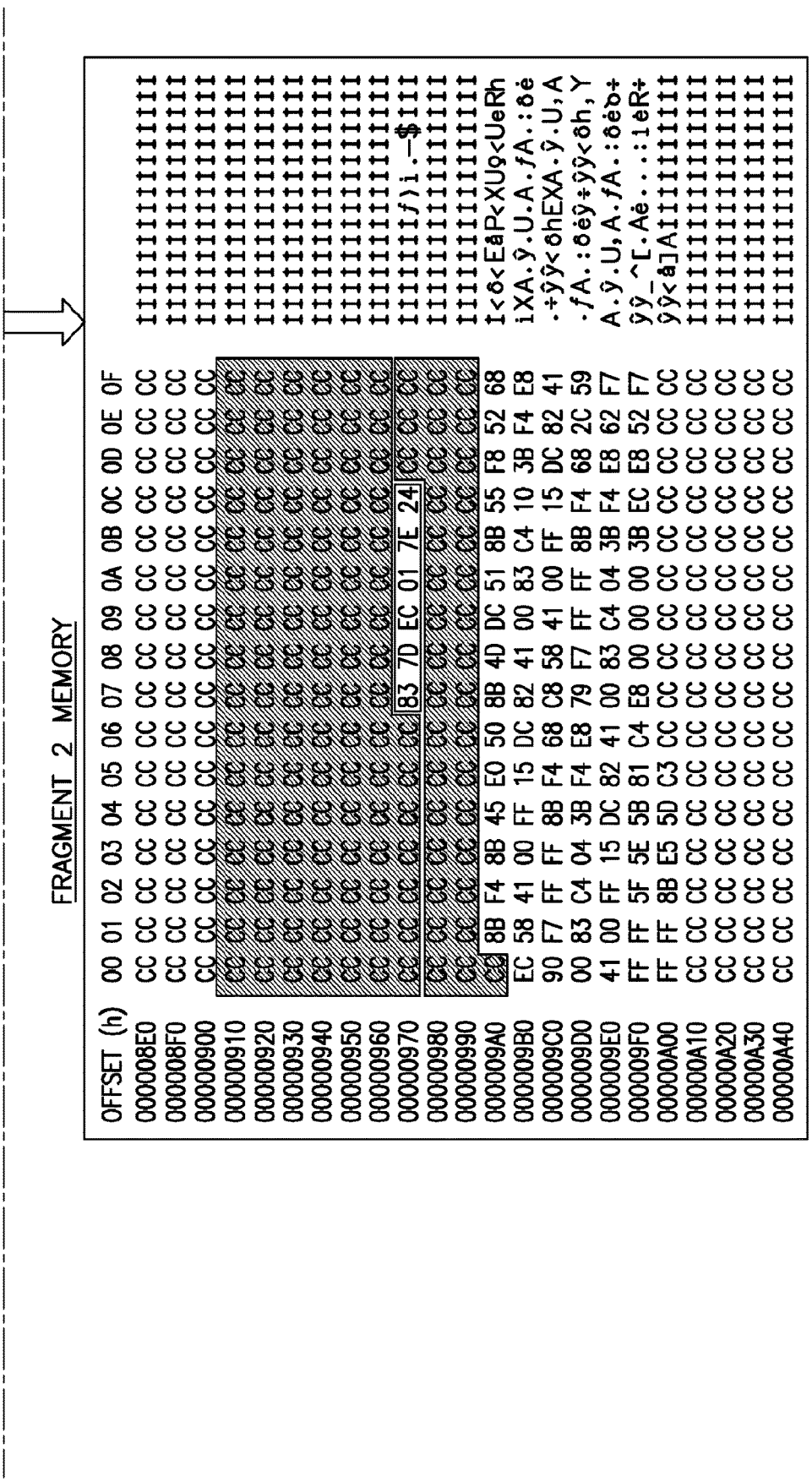
FIG. 11 is a schematic representation showing an exemplary fractionation of a memory.

FIG. 11 shows a basic application's memory space before and after it has been separated into two views. Generally speaking, disassembling either of the views results in an incomplete view of the CPI algorithm.

Example Fractionator Implementation #1: The Trebuchet Hypervisor

Figure 12:
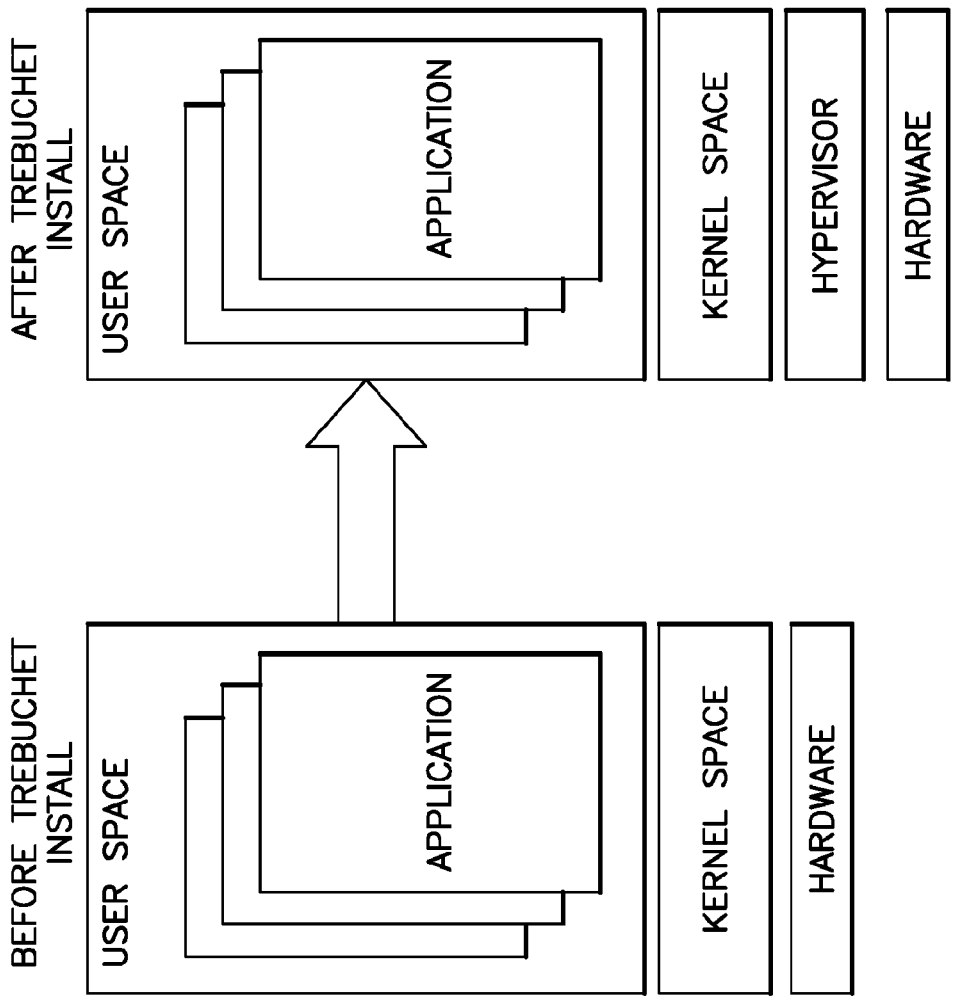
FIG. 12 is a schematic representation of an exemplary implementation showing a Trebuchet that dynamically installs itself under a running operating system.

In order to demonstrate that memory fractionation can be added to an existing protection system, Trebuchet, a custom thin hypervisor built by Siege Technologies, LLC to support Research and Development (R&D) programs, was used as the representative system. Trebuchet leverages the Intel virtualization extension and is able to support a single unmodified commodity Operating System (OS). It can dynamically hoist a running OS into a virtual machine state and place it back on the hardware on demand, as shown, for example, in FIG. 12.

In addition to monitoring events, Trebuchet can protect hypervisor, kernel and process memory by either making them read-only or invisible. These features, while somewhat primitive, provide a foundation for modules to perform advanced security capabilities, such as Data Exfiltration Detection for 0-day malware.

Figure 13:
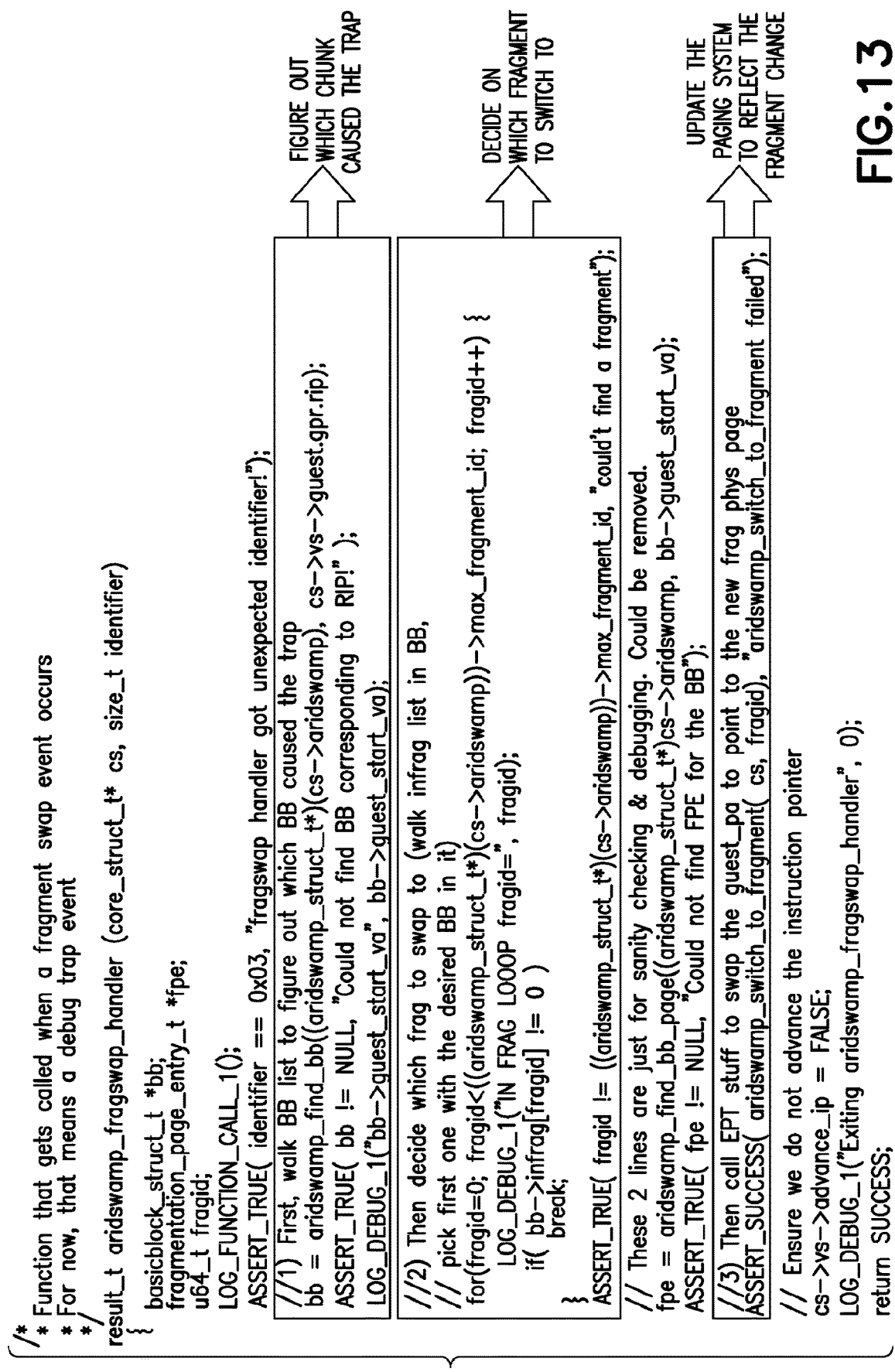
FIG. 13 represents an exemplary hypervisor runtime event handling sequence.

The hypervisor is notified whenever a debug trap instruction is executed. When that happens, the hypervisor examines the address that caused the exception to determine if it was associated with a view change. If it was, then the hypervisor will decide on which view to switch to. Once it knows the view to switch to the hypervisor will use the Extended Page Tables (EPT) to switch the application to the new view. An example of this process is represented in FIG. 13.

Example Fractionator Implementation #2: Kernel Module

By leveraging existing memory management abstractions of the Linux kernel, the kernel module supports x86, ARM, and PowerPC architectures with minimal architecture specific changes. The kernel module operates from kernel space to fractionate user space programs. Due to its design as a loadable kernel module, the kernel module supports dynamic launching and teardown at any point after the loading the Linux kernel.

Implementation of the kernel module included porting the XML handling libraries and configuration file parsing. It also included implementation of a communication channel between user space and kernel space components at configuration file load time by using Netlink. Netlink is the standard Linux protocol for facilitating user space and kernel space communication. Netlink was chosen over the other user space communication mechanisms (e.g. device nodes, ioctls, procfs) due to the simplicity of sending structured data and the high bandwidth.

Applications can be registered for fractionation by running with a custom user space library that parses the configuration file and issues a request via Netlink to the kernel module. Similar to the Trebuchet hypervisor and microvisor fractionators, the kernel module transparently handles memory fractionation and management of fractionated processes.

Upon receiving the configuration file defining how the process should be fractionated, the kernel module modifies the target process memory layout to match the definition. The kernel module configures CFCFT to occur at the defined address by introducing trap opcodes that cause a trap back to the kernel module handler. These trap opcodes are generally architecture specific:

X86 uses OxCC, the defined trap exception.

PowerPC uses 0x7fe00008, the defined unconditional trap exception.

ARMv7 uses 0x27f002f0, a custom undefined instruction.

The kernel mechanism by which the KERNEL MODULE must register to receive the trap reason which indicates a CFCFT is also generally specific to each architecture: X86 and PowerPC: the kernel module registers with the kernel's "notifier chain," which is triggered when a CFCFT is hit; the kernel module filters these notifications based on the list of processes being fractionated.

ARM: the ARM kernel handles traps differently; as a result the kernel module uses a private kernel function to register with the kernel's undefined opcode handler which is triggered when a CFCFT is hit.

When a fractionated process reaches a CFCFT, the kernel module identifies the faulting page and manipulates page management structures to swap the pages without needing to notify the process of the change.

Specifically, the kernel module handles the CFCFT by first using a structure containing the user-mode state at the time of the trap to check if the current process is being fractionated. If it is a new child of a fractionated process, it is added to the list of tracked processes since child processes will inherit the pages of the parent. The data structure associated with each fractionated process contains two linked lists of pages: one of currently mapped in pages, which will be freed by Linux, and one of unmapped pages, which must be freed by the kernel module. After determining that the kernel module should handle the trap as a CFCFT, the process structure is locked. Then each unmapped page that maps to the address space where the trap occurred is iteratively searched for a page not containing a trap opcode at the trapped address. Once found, the correct page is swapped in and the TLB is flushed. If a suitable page is not found due to a bad configuration file or confused thread state, the process is delivered an un-ignorable SIGBUS to indicate a non-existent physical address.

Besides handling normal CFCFT, the kernel module also monitors the list of running processes to identify when it can free the tracking structures and pages of non-running fractionated processes.

Memory Fractionation Across Multi-Board Systems

Memory fractionation can also apply to a multi-board system. In the simplest case, the fractionation is implemented independently on each board. This is the simplest implementation requiring no change to the existing system. The multi-board setup allows for additional protection from memory fractionation by effectively splitting a binary image between multiple computers. Single board computers (SBCs) are considered in this example, but the design is applicable to any multi-board system including networked computers.

Figure 14:
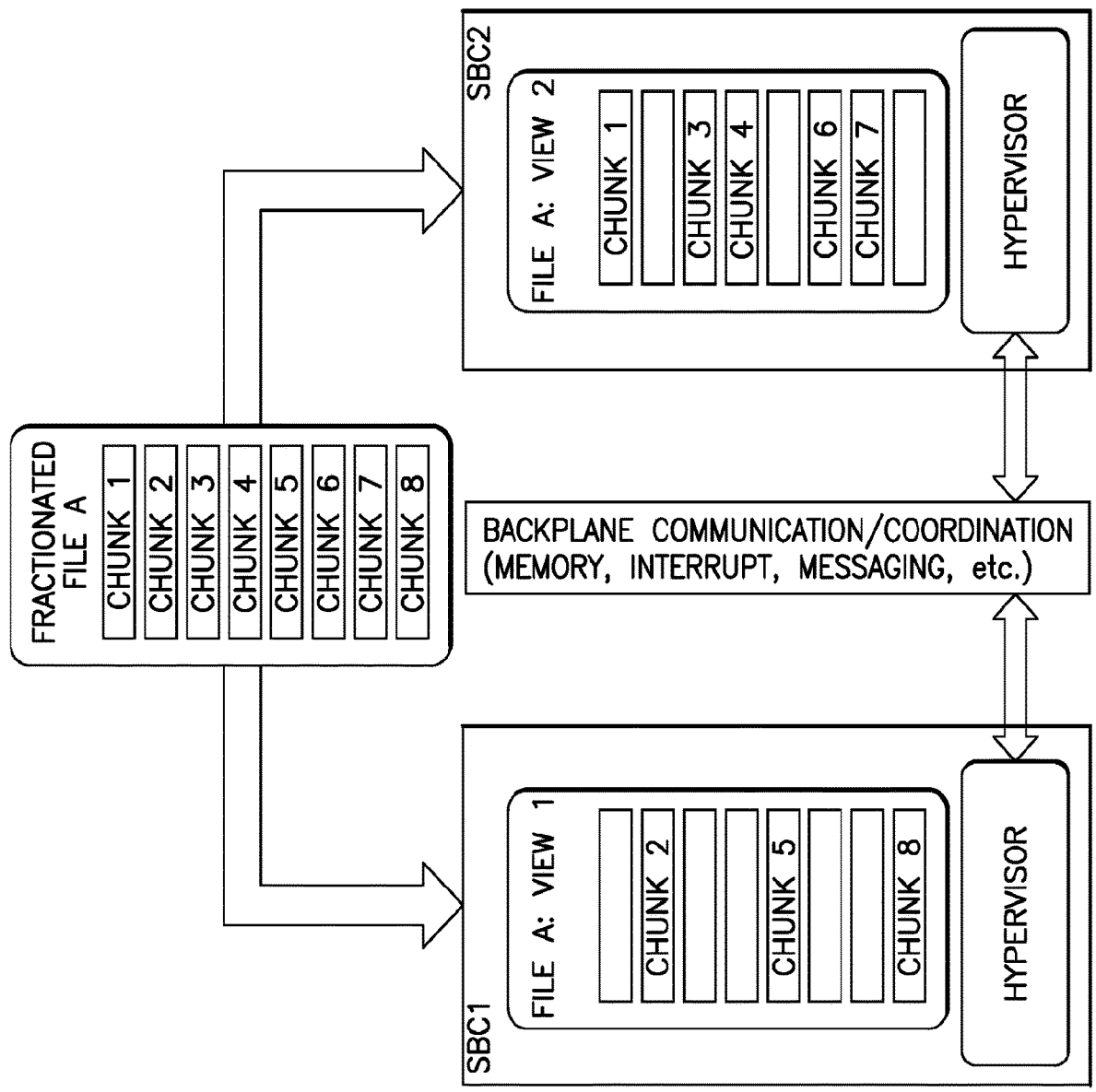
FIG. 14 is a schematic representation showing an exemplary memory fractionation in a multi-board environment.

FIG. 14 shows an example of a multi-board environment with a fragmented application. Each SBC (SBC1 and SBC2) has a subset of the code for the application so an attacker grabbing a full RAM snapshot of either SBC would be incapable of reconstructing the original fragmented File A. This approach would have clear benefits for security (although not perfect, since an attacker grabbing a full RAM snapshot from BOTH SBCs still has all the pieces necessary for reconstruction), in a typical implementation, there may be significant performance implications. Memory fractionation in a multi-board environment generally has two types of CFCFTs—Intra SBC CFCFT (switching to a fragment that is on the same SBC that the current code is executing on) and Inter SBC CFCFT (switching to a fragment that is on a different SBC). Whereas Intra SBC CFCFTs are analogous to the CFCFTs in memory fractionation on a single board system, Inter SBC CFCFTs present a new challenge. Inter SBC CFCFTs can be much more expensive in terms of performance impact as they generally incur additional delays associated with communication across the backplane.

This peer-to-peer model has the two SBCs, labeled SBC1 and SBC2 in this example, both executing and storing fragments of the program. A client-server model is possible too in which SBC1 executes the code but only caches a subset of the memory fragments at any point in time; if a needed fragment is not found, it can probe SBC2, which acts as the "fragment server". SBC2 acts as swap space for SBC1 and can accept a no-longer-needed fragment in exchange. These variants on the multi-board memory fractionation design are detailed below.

Encryption Variants

Variant 1: SBC2 contains encrypted versions of the chunks for SBC1, but not the key material necessary to decrypt. SBC1 executes the code and has the key material. It is responsible for ensuring that the fragments being "swapped out" get encrypted first and the fragments being "swapped in" get decrypted after they are received from SBC2. With this model, an attacker compromising SBC2 has the entire program A, but in an encrypted form and does not have access to the key material. An attacker compromising SBC1 has the key, but gains only a subset of fragments rather than access to all of the encrypted program.

There are still attack models that break this (attacker goes after SBC1, grabs the key material, then starts requesting fragments from SBC2 one at a time until collecting the entire encrypted application). This attack would generally require observation of the program long enough that all of the chunks have been requested or for the attacker to circumvent the fractionation runtime so that they could submit fragment requests. The delivery of fragments from SBC2 to SBC1 could be optimized by utilizing methods common to cache look ahead such as branch prediction.

Variant 2: Each fragment on SBC1 is encrypted with different keys. Then SBC1 can hold the entire encrypted program, minimizing the amount of data transferred across the backplane, while SBC2 acts as a key store. SBC1 requests fragment keys on-demand (or with a predictor as above), but can only cache X number of keys at a time, where X is less than the total number of memory views. SBC2 has all the keys and sends them via point-to-point communications with SBC1 across the backplane; however, SBC2 never has access to the encrypted data. If a particular fragment's execution is time critical, it can be left unencrypted so that the cost of requesting the key and decrypting the chunk is not incurred. This generally allows for finer granularity in offline configuration to achieve the balance between security and performance required by the application.

Figure 15:
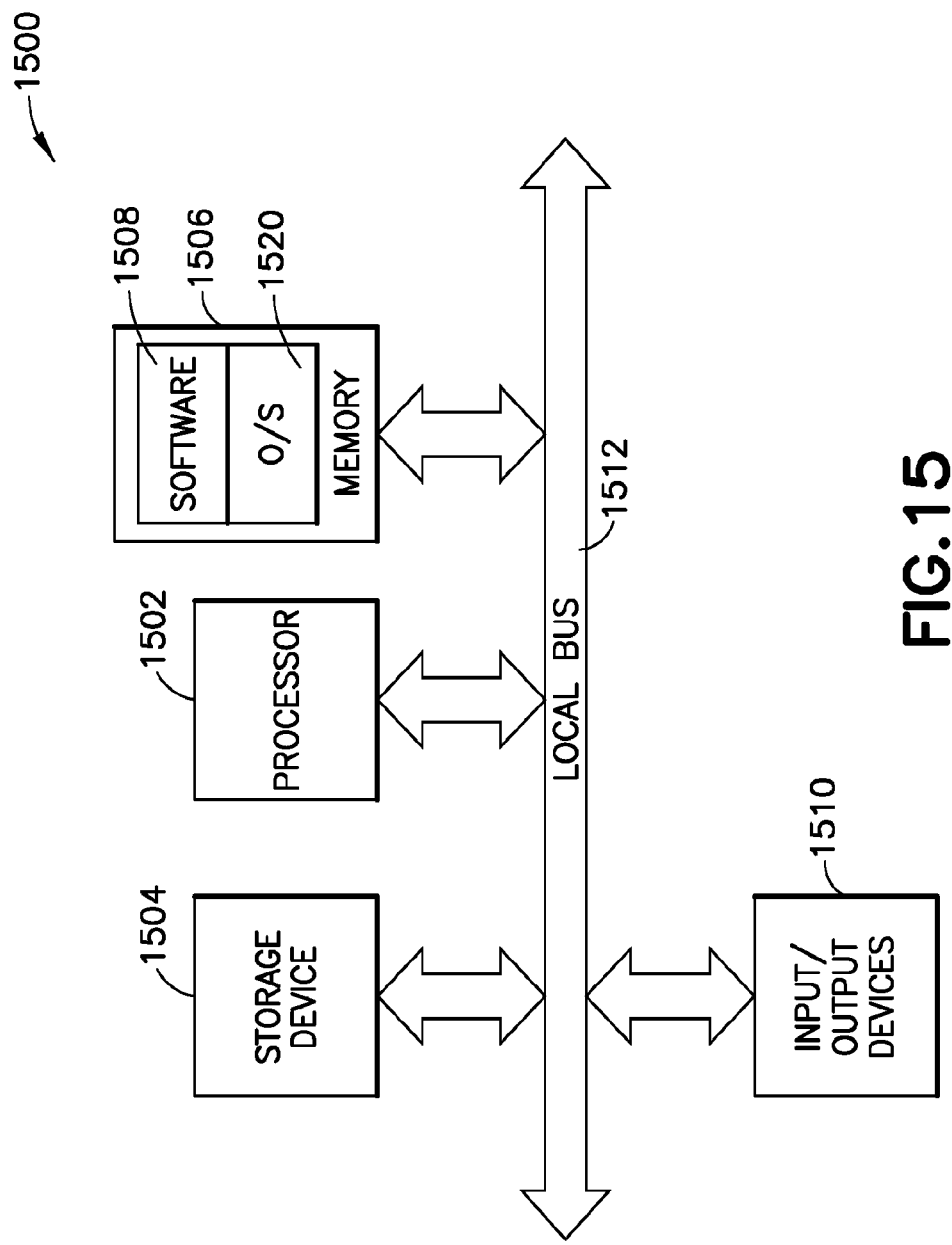
FIG. 15 is a schematic diagram showing an example of a computer.

FIG. 15 is a schematic diagram showing an example of a computer 1500. In general, the illustrated computer 1500 is configured to, and does, execute and/or facilitate one or more of the functionalities associated with fractionation described herein. The illustrated computer 1500 has a processor 1502, a storage device 1504, a memory 1506 having software 1508 stored therein that, when executed by the processor, causes the processor to perform or facilitate one or more of the functionalities described herein, input and output (I/O) devices 1510 (or peripherals), and a local bus, or local interface 1512 allowing for communication within the computer 1500. The local interface 1512 can be, for example, one or more buses or other wired or wireless connections. The computer 1500 may have additional elements, which are omitted for simplicity, such as controllers, buffers (caches), drivers, repeaters, and receivers, to facilitate communications and other functionalities. Further, the local interface 1512 may include address, control, and/or data connections to enable appropriate communications among the illustrated components.

The processor 1502 may be a hardware device for executing software, particularly that stored in the memory 1506. The processor 1502 can be any custom made or commercially available single core or multi-core processor, a central processing unit (CPU), an auxiliary processor among several processors associated with the present computer 1500, a semiconductor based microprocessor (in the form of a microchip or chip set), a macroprocessor, or generally any device for executing software instructions.

The memory 1506 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 1506 may incorporate electronic, magnetic, optical, and/or other types of storage media. The memory 1506 can have a distributed architecture, where various components are situated remotely from one another, but can be accessed by the processor 1502.

In a typical implementation, the memory 1506 acts as a host for the relational database disclosed herein.

The software 1508 defines various aspects of the server functionality. The software 1508 in the memory 1506 may include one or more separate programs, each of which contains an ordered listing of executable instructions for implementing logical functions of the computer 1502, as described herein. The memory 1506 may contain an operating system (O/S) 1520. The operating system essentially controls the execution of programs within the computer 1500 and provides scheduling, input-output control, file and data management, memory management, and communication control and related services.

The I/O devices 1510 may optionally include one or more of any type of input or output device(s). Examples include a keyboard, mouse, scanner, microphone, printer, display, etc. The I/O devices 1510 may include one or more devices that communicate via both inputs and outputs, for instance a modulator/demodulator (modem; for accessing another device, system, or network), a radio frequency (RF) or other transceiver, a telephonic interface, a bridge, a router, or other device. In some implementations, the user having administrative privileges may access the system to perform administrative functions through the I/O devices 1510.

In general, when the computer 1500 is in operation, the processor 1502 executes the software 1508 stored within the memory 1506, communicates data to and from the memory 1506, and generally controls operations of the computer 1500 pursuant to the software 1508. Moreover, in a typical implementation, the processor 1502 is configured to perform one or more (or any combination of, including all) of the functionalities disclosed herein. Moreover, in a typical implementation, the memory is configured to support the processor in this regard and to store any data necessary or helpful to facilitate those functionalities.

A number of embodiments of the invention have been described. Nevertheless, it will be understood that various modifications may be made without departing from the spirit and scope of the invention.

For example, fractionation may be performed in any number of possible ways. Although fractionation generally produces views or fractions that are different sizes, two or more of the fractions produced may be the same size as each other.

Additionally, fractionation may produce two or more fractions or views. Indeed, in some implementations (e.g., where a high degree of security is desired), a large number of fractions may be produced.

Moreover, the specific storage techniques (e.g., for hiding certain fractions from the user or kernel space) may be used.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting or being implemented in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and performing certain operations in parallel may be performed and be advantageous.

Other embodiments of systems and methods of the invention include corresponding systems, apparatus, and computer programs, configured to perform the actions of the methods, encoded on computer storage devices, including non-transitory computer-readable media (e.g., memory storage disks and drives, etc.). These and other embodiments can each optionally include one or more of the features and any combination thereof as specified in the claims at the end of this specification.

Other implementations are within the scope of the claims.

What is claimed is:

1. A method of protecting software in a computer system, the method comprising:
   defining a memory fractionation configuration for an application software program in the computer system, wherein:
   the application software includes two or more pages of code blocks, and
   the memory fractionation configuration represents how the code blocks should be assigned to different code block fractions based, at least in part, on a first frequency with which one or more code blocks of a first code block fraction are transferred to a second code block fraction;
   fractionating at least one page of the application software program into the code block fractions according to the memory fractionation configuration;
   running the application in such a manner that, at any particular point in time when the application is running, at least one of the first and second code block fractions is stored in a manner that is not accessible from a user space or a kernel space of the computer system, according to the memory fractionation configuration;
   determining whether the first frequency is greater than or equal to a predetermined value;
   in accordance with a determination that the first frequency is greater than or equal to the predetermined value, reducing the first frequency to a second frequency with which one or more code blocks of the first and second code block fractions are transferred between the first and second code block fractions; and
   defining the memory fractionation configuration to represent how the code blocks should be assigned to different code block fractions based, at least in part, on the second frequency.

2. The method of claim 1, wherein at the particular point in time when the application is running, the second code block fraction is stored in a manner that is accessible from the user space or the kernel space of the computer system.

3. The method of claim 2, further comprising:
   switching, over time, which of the fractions is accessible from the user space or the kernel space and which of the fractions is not accessible from the user space or the kernel space, between the first and second code block fractions, based, at least in part, on the first frequency.

4. The method of claim 3, further comprising:
   providing a fractionator to perform the switching,
   wherein the fractionator is implemented in the user space, the kernel space or a hypervisor space.

5. The method of claim 2, wherein the first code block fraction is a different size than the second code block fraction.

6. The method of claim 2, wherein each of the first and second code block fractions is smaller than a page size of the application.

7. The method of claim 1, further comprising generating a configuration file that describes the memory fractionation configuration.

8. The method of claim 7, further comprising:
   generating multiple different configuration files for the application software program; and
   cycling through the multiple different configuration files while the application is running.

9. The method of claim 1, wherein defining the memory fractionation configuration comprises using a computer-based processor to group code chunks into respective fractions based, at least in part, on a number of cross fraction control flow transfers associated with a control flow graph for each respective one of a plurality of candidate memory fractionation configurations.

10. The method of claim 1, wherein the fractionating is implemented at a hypervisor space, a microvisor space, a kernel space or a user space.

11. The method of claim 1, wherein the fractionation is transparent to the application.

12. The method of claim 1, wherein at least one of the code block fractions is at a first board and at least another one of the code block fractions is at a second board.

13. The method of claim 12, wherein the first board and the second board are in a multiboard computer.

14. A computer system comprising:
   a first computer configured to define a memory fractionation configuration for an application software program in a computer system,
   wherein:
   the application software includes two or more pages of code blocks;
   the memory fractionation configuration represents how the code blocks should be assigned to different code block fractions based, at least in part, on a first frequency with which one or more code blocks of a first code block fraction are transferred to a second code block fraction; and the first computer or a second computer is configured to:
fractionate, with a computer-based fractionator, at least one page of the application software program into the code block fractions according to the memory fractionation configuration;
run the application, with a computer-based runtime support module, in such a manner that, at any particular point in time when the application is running, at least one of the first and second code block fractions is stored, in a first computer-based memory storage device, in a manner that is not accessible from a user space or a kernel space of the computer system, according to the memory fractionation configuration;
    determine whether the first frequency is greater than or equal to a predetermined value;
    in accordance with a determination that the first frequency is greater than or equal to the predetermined value, reduce the first frequency to a second frequency with which one or more code blocks of the first and second code block fractions are transferred between the first and second code block fractions; and
    define the memory fractionation configuration to represent how the code blocks should be assigned to different code block fractions based, at least in part, on the second frequency.

15. The computer system of claim 14, wherein at the particular point in time when the application is running, the second code block fraction is stored, in a second computer-based memory storage device, in a manner that is accessible from the user space or the kernel space of the computer system.

16. The computer system of claim 15, wherein the runtime support module is further configured to switch, over time, which of the fractions is accessible from the user space or the kernel space and which of the fractions is not accessible from the user space or the kernel space, between the first and second code block fractions, based, at least in part, on the first frequency.

17. The computer system of claim 16, wherein the fractionator is implemented based on a user space, kernel space or hypervisor space.

18. The computer system of claim 15, wherein the first code block fraction is a different size than the second code block fraction.

19. The computer system of claim 15, wherein each of the first and second code block fractions is smaller than a page size of the application.

20. The computer system of claim 14, wherein the fractionator is further configured to generate a computer configuration file that describes the memory fractionation configuration.

21. The computer system of claim 20, wherein the fractionator is further configured to:
    generate multiple different configuration files for the application software program; and
    cycle through the multiple different configuration files while the application is running.

22. The computer system of claim 14, wherein the fractionator is further configured to define the memory fractionation configuration by grouping code chunks into respective fractions based, at least in part, on a number of cross fraction control flow transfers associated with a control flow graph for each respective one of a plurality of candidate memory fractionation configurations.

23. The computer system of claim 14, wherein the fractionator is implemented at a hypervisor space, a microvisor space, a kernel space or a user space.

24. The computer system of claim 14, wherein at least one of the code block fractions is at a first board and at least another one of the code block fractions is at a second board in the computer system.

25. The computer system of claim 24, wherein the first board and the second board are in a multiboard computer.

26. A non-transitory, computer-readable medium that stores instructions executable by a processor to perform the steps comprising:
    defining a memory fractionation configuration for an application software program in the computer system, wherein:
the application software includes two or more pages of code blocks,
the memory fractionation configuration represents how the code blocks should be assigned to different code block fractions based, at least in part, on a first frequency with which one or more code blocks of a first code block fraction are transferred to a second code block fraction;
    fractionating at least one page of the application software program into the code block fractions according to the memory fractionation configuration;
    running the application in such a manner that, at any particular point in time when the application is running, at least one of the first and second code block fractions is stored in a manner that is not accessible from a user space or a kernel space of the computer system, according to the memory fractionation configuration;
    determining whether the first frequency is greater than or equal to a predetermined value;
    in accordance with a determination that the first frequency is greater than or equal to the predetermined value, reducing the first frequency to a second frequency with which one or more code blocks of the first and second code block fractions are transferred between the first and second code block fractions; and
    defining the memory fractionation configuration to represent how the code blocks should be assigned to different code block fractions based, at least in part, on the second frequency.

\* \* \* \* \*